Figure 1A:
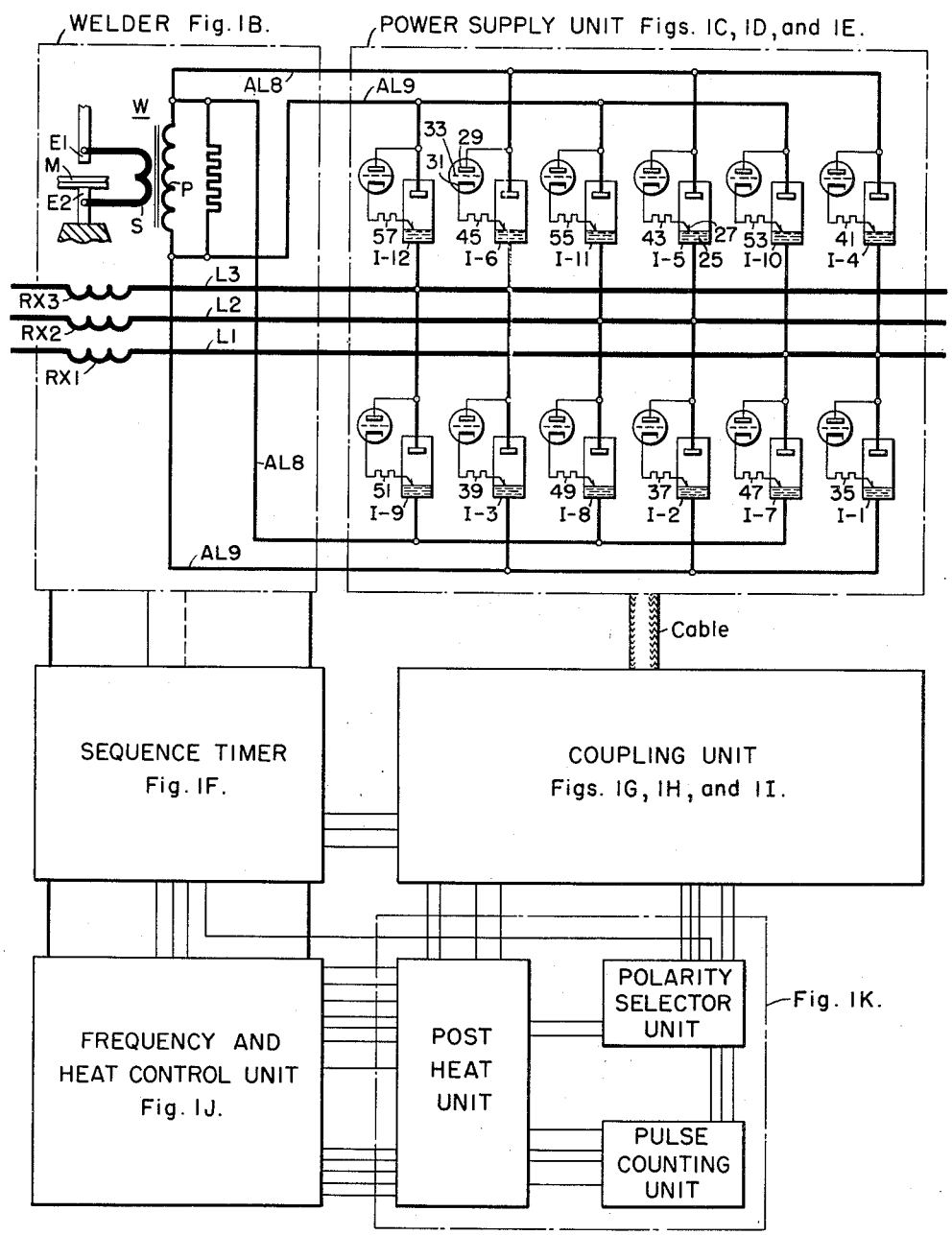
Figure 1B:
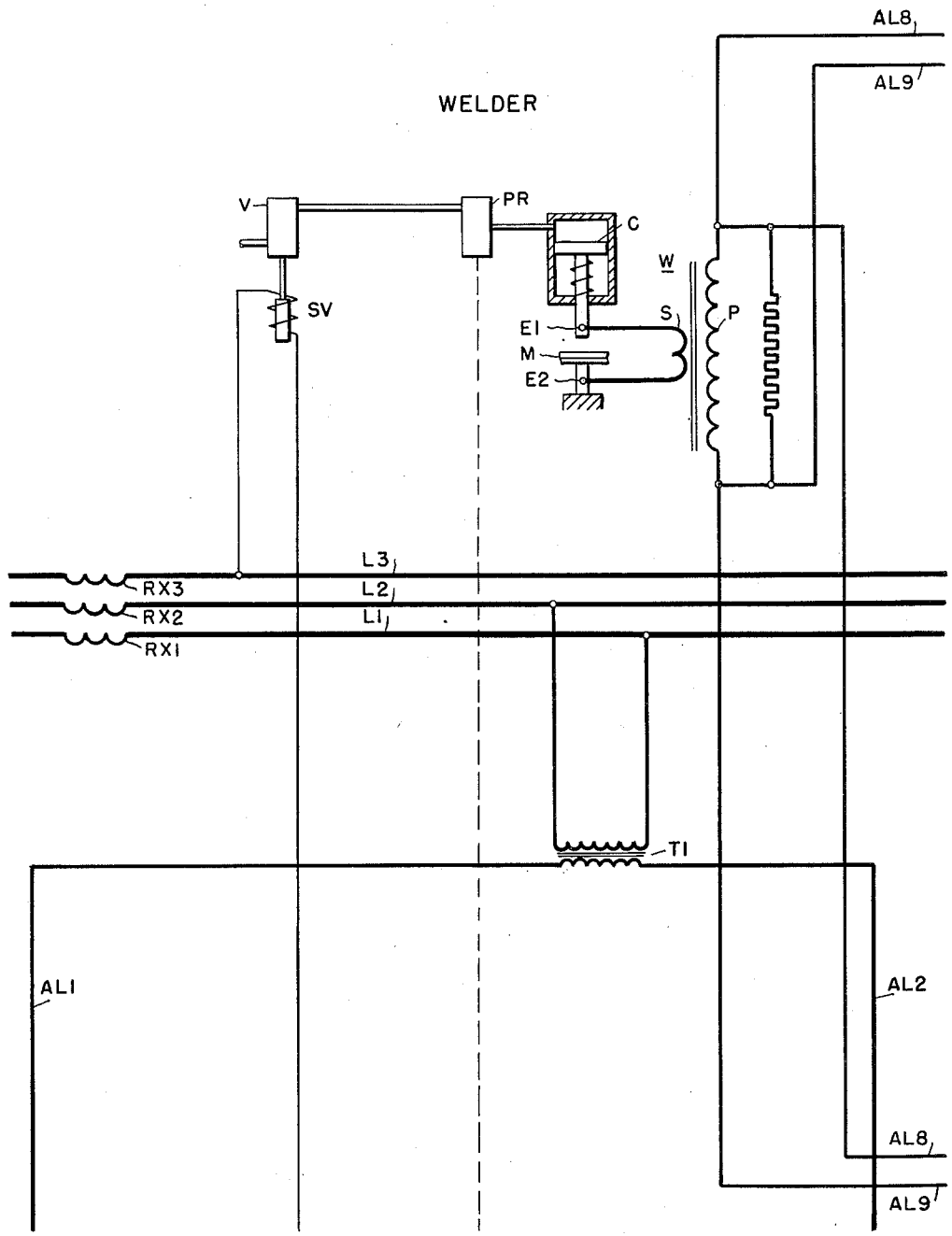
Figure 1C:
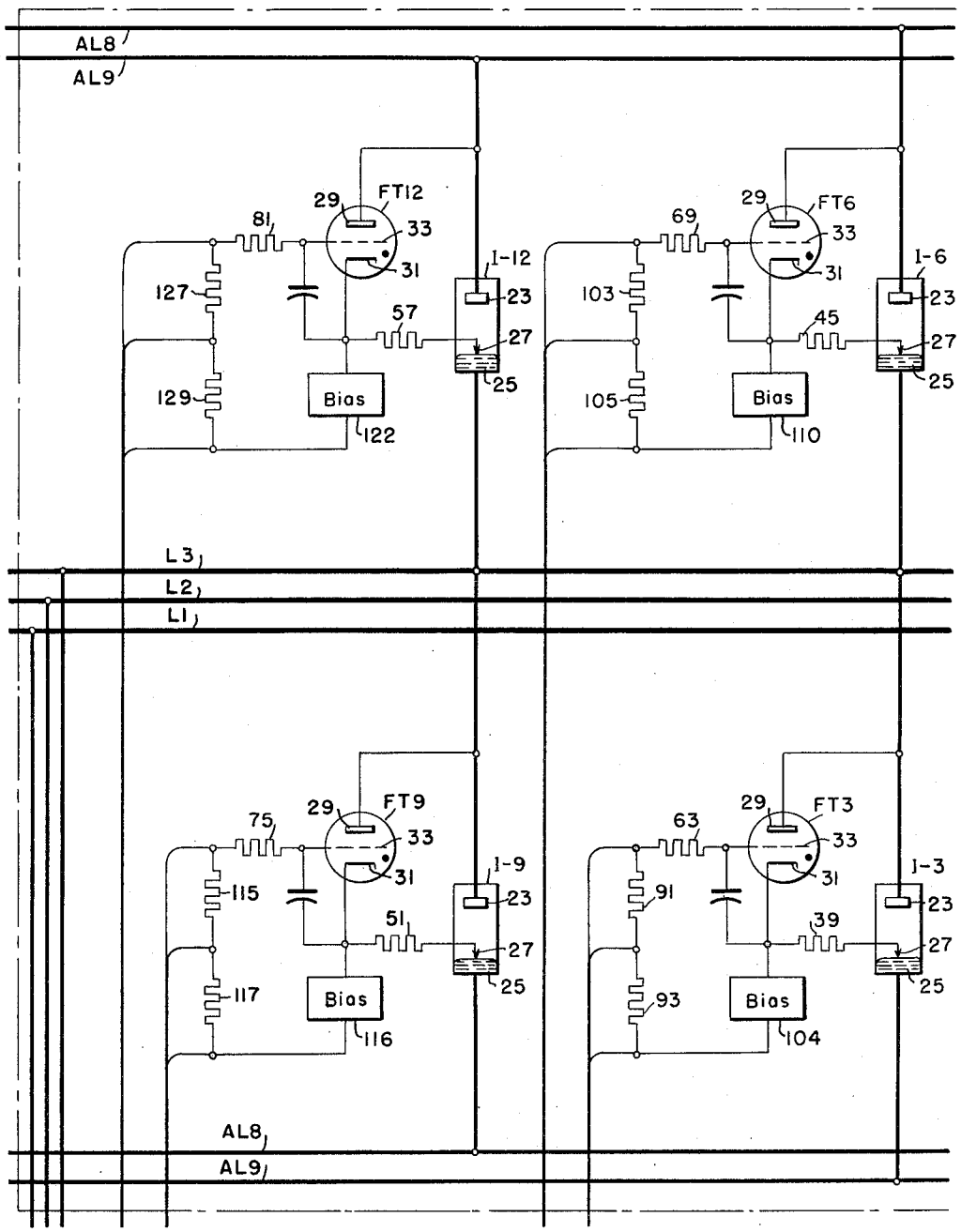
Figure 1D:
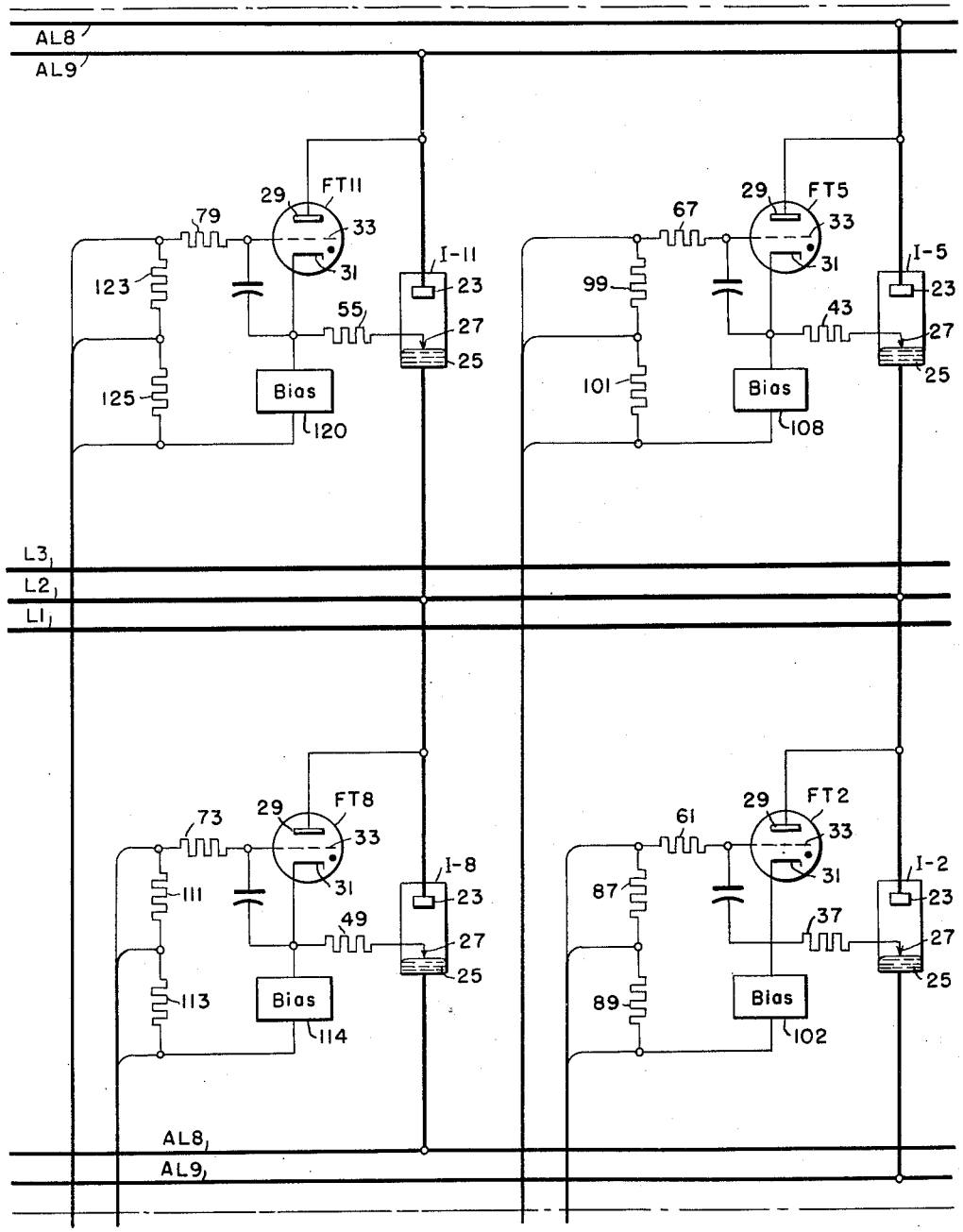
Figure 1F:
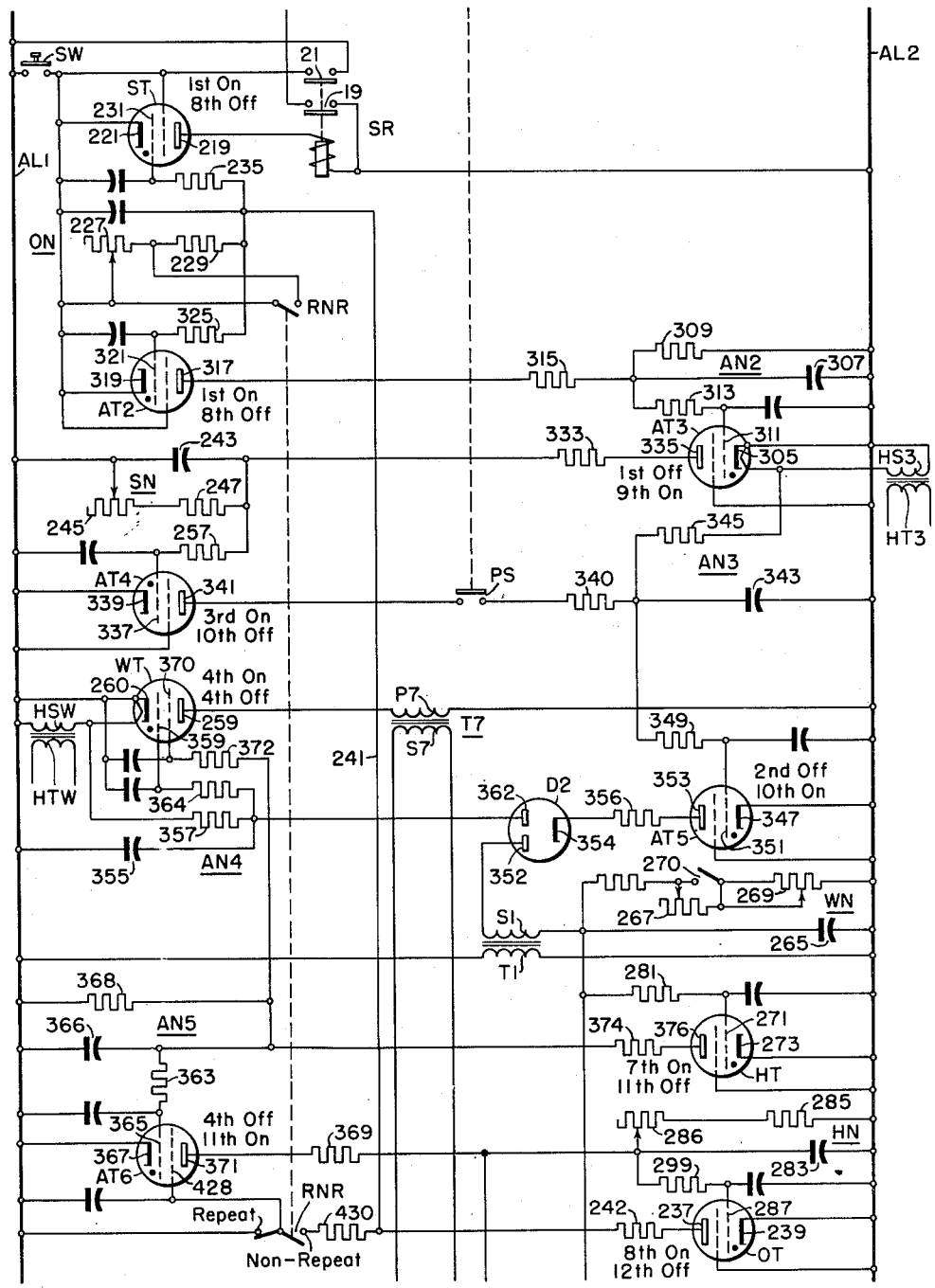
Figure 1G:
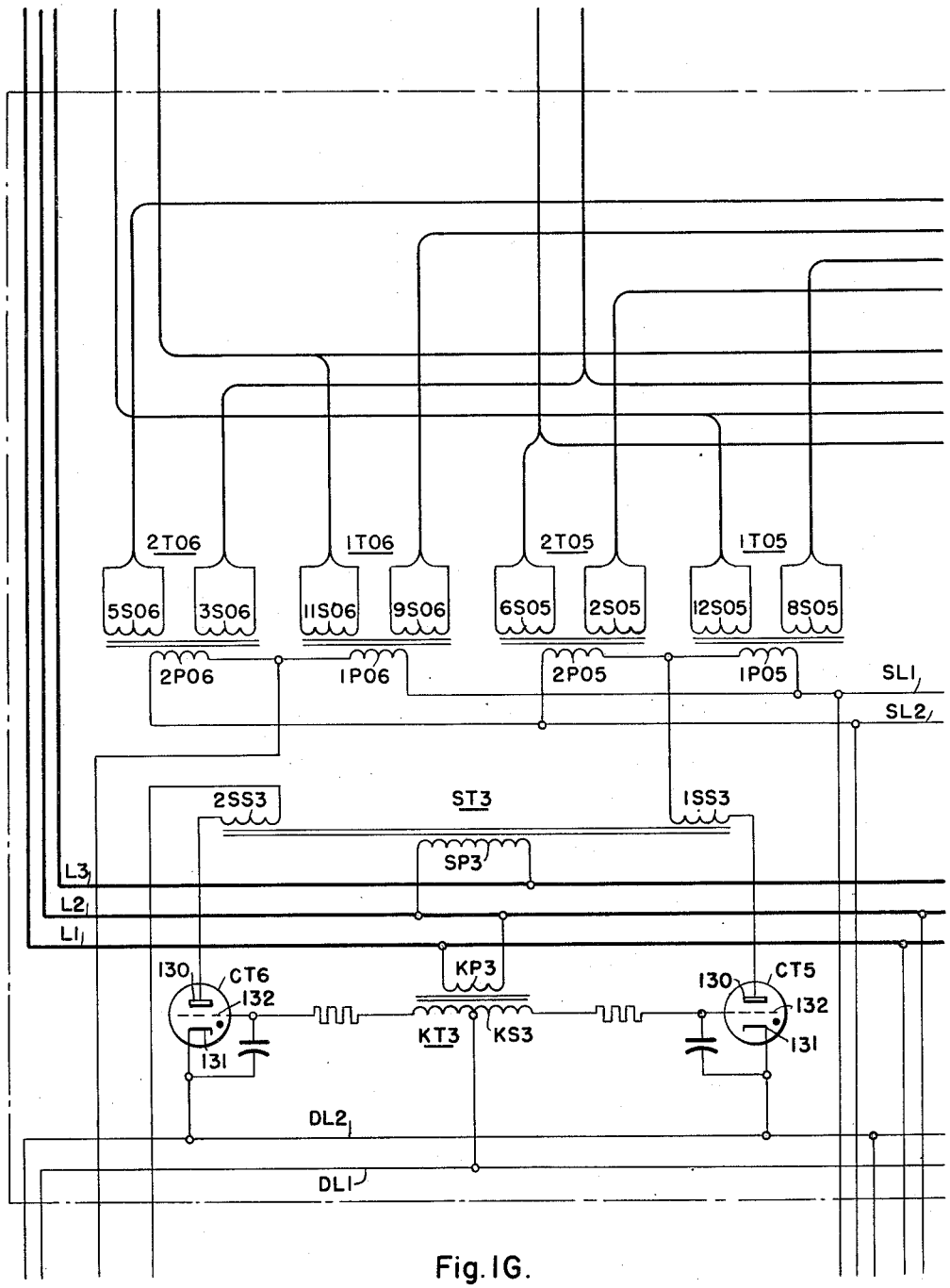

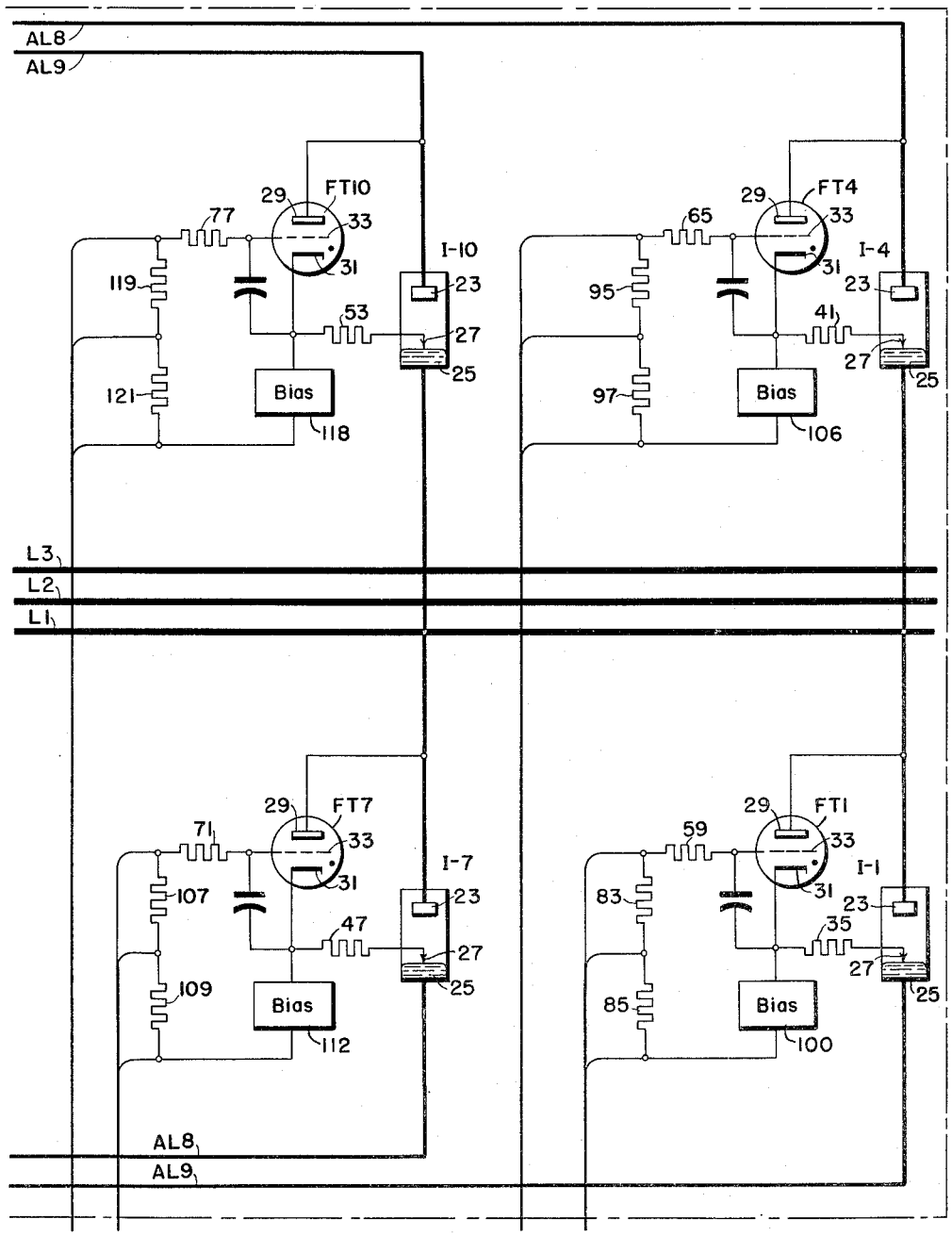
Fig. IE

SEQUENCE TIMER

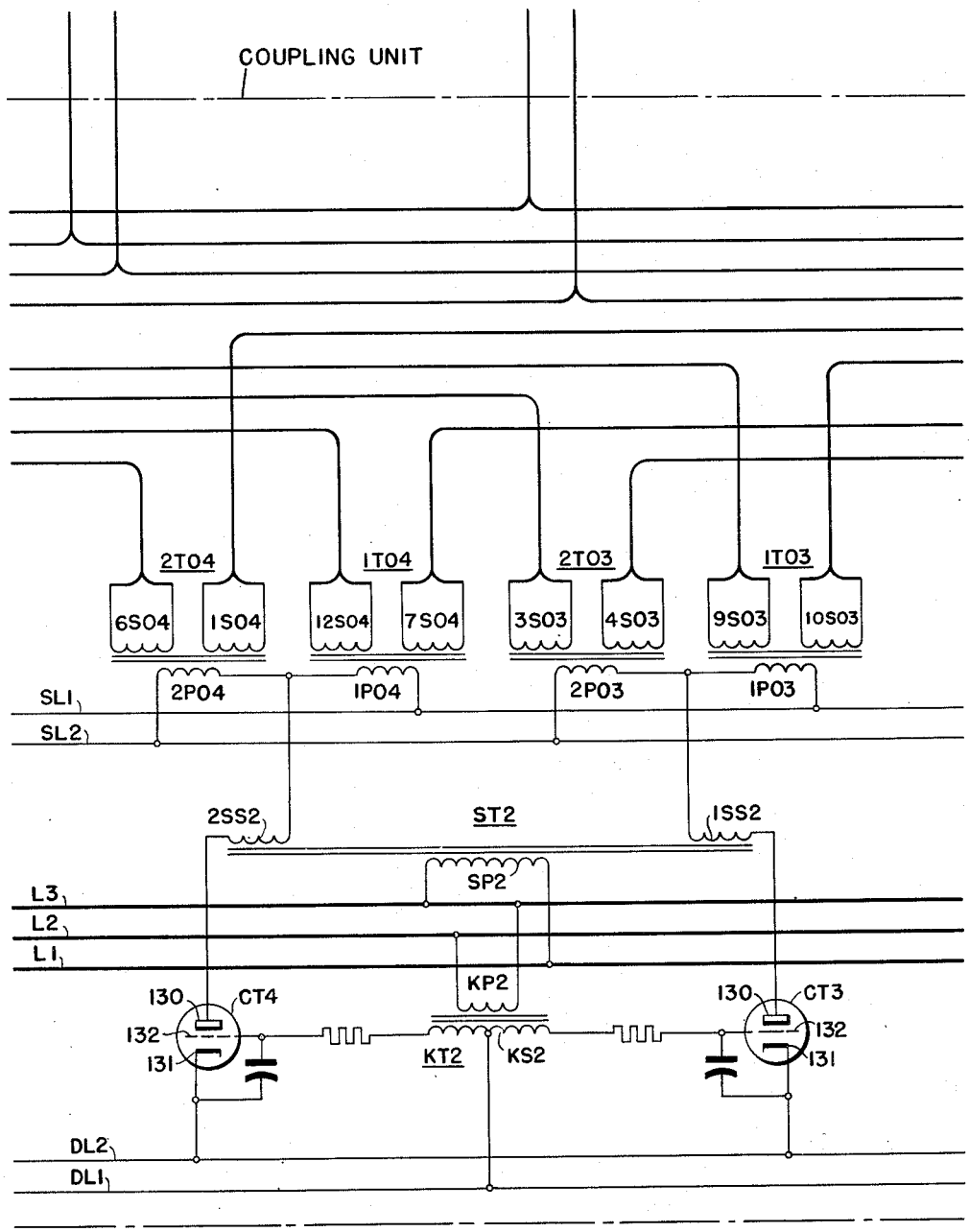
Fig. IH.

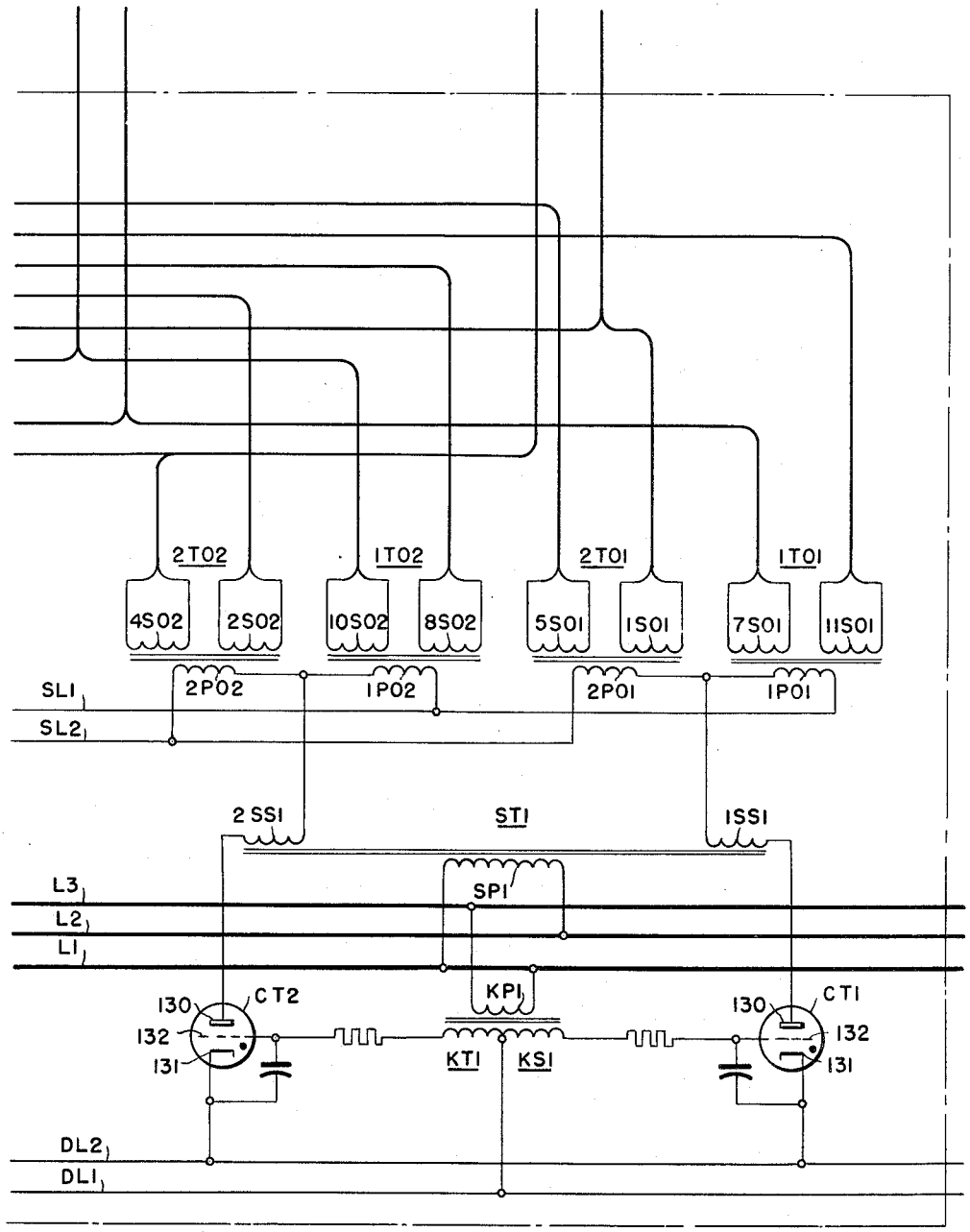
Fig. II.

Aug. 21, 1956   H. W. VAN NESS   2,760,141
ELECTRIC DISCHARGE APPARATUS
Filed June 4, 1952   17 Sheets-Sheet 16

WITNESSES:
John E. Hensley
Leon J. Vaga

INVENTOR
Hubert W. Van Ness.
BY
Reymer Diamond
ATTORNEY

Aug. 21, 1956     H. W. VAN NESS     2,760,141
ELECTRIC DISCHARGE APPARATUS
Filed June 4, 1952     17 Sheets-Sheet 17
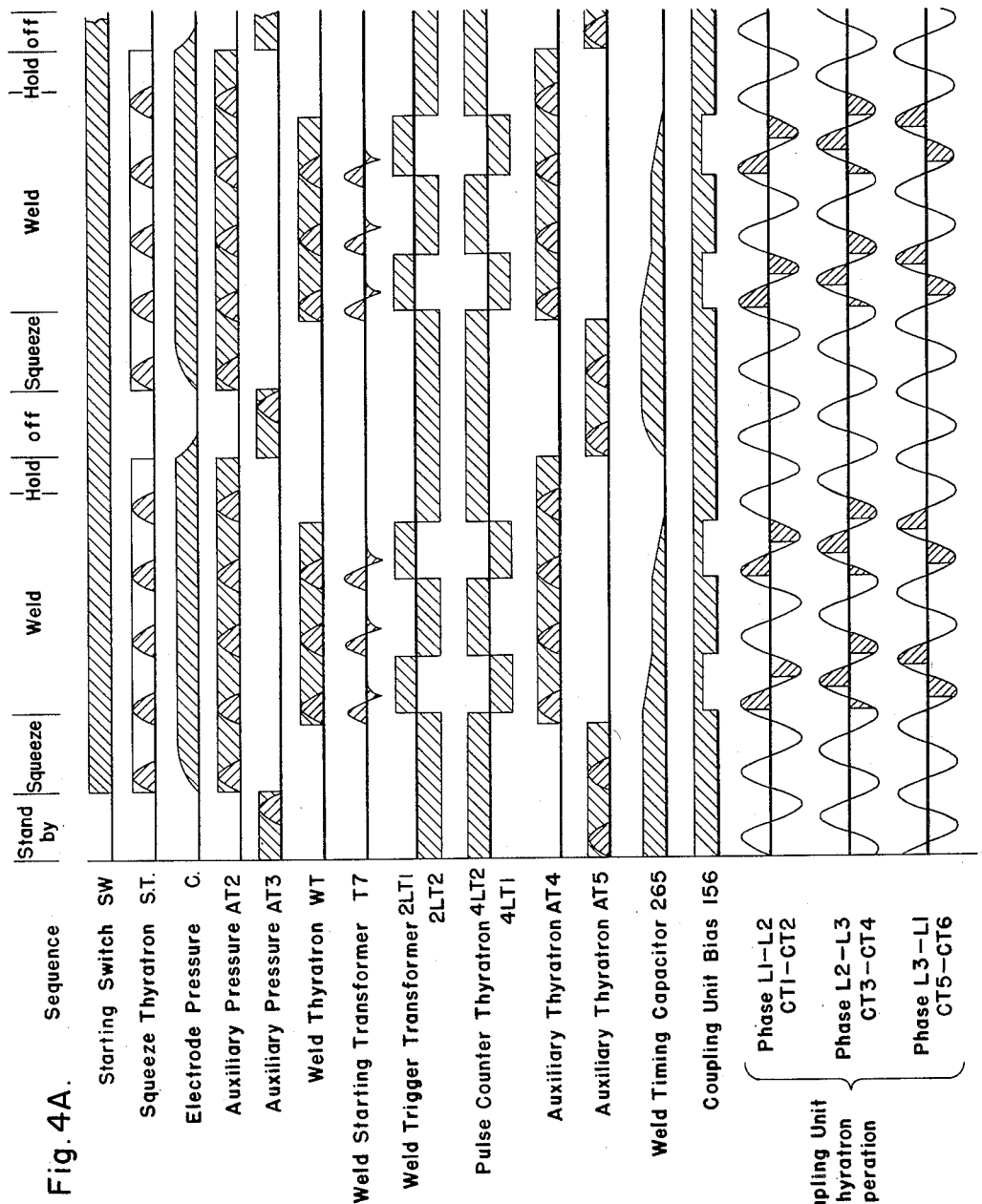
INVENTOR
Hubert W. VanNess

United States Patent Office 2,760,141
Patented Aug. 21, 1956

2,760,141

ELECTRIC DISCHARGE APPARATUS

Hubert W. Van Ness, Buffalo, N. Y., assignor to Westinghouse Electric Corporation, East Pittsburgh, Pa., a corporation of Pennsylvania Application June 4, 1952, Serial No. 291,598

12 Claims. (Cl. 321—7)

My invention relates to electric discharge apparatus and has particular relation to control apparatus for polyphase to single phase low-frequency welders, such as is disclosed in applications Serial No. 272,818, filed February 21, 1952, and Serial No. 283,892, filed April 23, 1952, both to Clarence B. Stadum, Edward C. Hartwig and me, and both assigned to Westinghouse Electric Corporation.

The above-described applications relate to control apparatus for polyphase to single phase low-frequency welders in which the power for welding is derived through electric discharge valves interposed between a polyphase supply and the primary of a welding transformer. In the apparatus disclosed in the earlier application, the reversal of the load current is effected by operation of mechanical reversing contactors; in that disclosed in the later application, the reversal is effected by means of mechanical relays. The apparatus disclosed in these applications is highly satisfactory for most of the welding applications which arise. However, to expand the usefulness of welding to meet the ever-increasing needs of industry, it is desirable that very high-speed, highly flexible welding apparatus be provided. The mechanical contactors and relays of the apparatus disclosed in the above-described applications militate to an extent against this literally unlimited expansion of the use of welding.

It is, accordingly, an object of my invention to provide highly flexible, very high-speed welding apparatus.

It is also an object of my invention to provide control apparatus for a polyphase to single phase low-frequency welder which uses electronic instead of mechanical switching components.

It is another object of my invention to provide a polyphase to single phase low-frequency welding system, the control of which uses electronic instead of mechanical switching components.

In accordance with my invention, I provide control apparatus which includes electronic components, such as thyratrons and high-vacuum tubes, in places where relays are ordinarily used in accordance with the teachings of the prior art or of the above-entitled applications. Because of the complexity of the operation which is to be carried out in a polyphase to single phase low-frequency welder, an electronic system of this type is inherently highly complex. To reduce initial costs and the costs of installing and maintaining the apparatus, it is desirable that the complexity be reduced to the extent practicable.

It is, accordingly, a specific object of my invention to provide electronic control apparatus for a polyphase to single phase low-frequency welder of the simplest practicable construction.

The apparatus in accordance with my invention includes a power unit and several electronic assemblies or circuits which control the current conducted by the power unit through the primary of a welding transformer. For a proper understanding of my invention, it will be advantageous to consider the power unit first.

This unit may be regarded as a converter which transmits power between a plurality of power supply conductors or buses adapted to be connected to a polyphase source, and a pair of load conductors or buses which are connected to the two terminals of the single primary of a welding transformer. In one embodiment of my invention, four groups of electric discharge devices such as ignitrons are provided. Each of these devices has an anode, a cathode and an igniter of other control electrode. The anode of one ignitron of each of the first group is connected to a supply conductor and the cathode to one of the load conductors; the anode of each ignitron of the second group is connected to a different power supply conductor and the cathode to the other load conductor; the cathode of each ignitron of the third group is connected to a different power supply conductor and the anode to the first mentioned load conductor; the cathode of each ignitron of the fourth group is connected to a different power supply conductor and the anode to the other load conductor. Each of the ignitrons is controlled from a thyratron connected to conduct current through its igniter and the thyratrons are controlled from a heat control circuit. The ignitrons are so connected that those of the first and fourth groups, when rendered conductive, conduct current of one polarity through the primary, and those of the second and third groups, when rendered conductive, conduct current of the opposite polarity.

As will be realized from even a cursory consideration of the apparatus disclosed in the above-described applications, the heat-control portion of this apparatus is relatively complex. In providing the electronic apparatus, it is desirable that the heat-control apparatus be simplified.

It is, accordingly, also an object of my invention to provide a heat-control circuit of comparatively simple structure for a polyphase to single phase low-frequency welder.

In accordance with my invention, I provide a heat-control circuit including a coupling unit having connected thereto a network of simple structure for producing the heat control. The coupling unit includes a plurality of like circuit units, each unit being connected to fire a pair of ignitrons of the first and fourth groups and a corresponding pair of ignitrons of the second and third group, the two pairs of ignitrons deriving their power from the same two buses of the supply. Each circuit unit includes an auxiliary electric discharge device in circuit with a pair of the branch networks through which the firing of the ignitrons is directly effected. One network is connected to fire the associated ignitrons which conduct current of one polarity, and the other to fire the corresponding ignitrons which conduct current of the opposite polarity. The networks are connected in the anode circuit of each auxiliary device through selective electronic switch means so one or the other network may be selected. Each circuit unit is supplied with potential in phase with the potential of the phase of the source from which the corresponding ignitrons are supplied. This potential is impressed in the principal circuit of the auxiliary discharge device of the unit. In the control circuit of each auxiliary discharge device, a potential lagging the principal potential in phase and derived from another phase of the source than the one from which the associated ignitrons are supplied is impressed. On this potential, a pulsating direct-current potential is superimposed. The latter potential is controlled in accordance with the desired characteristics of the welding current. It may be set to provide firing at any angle in the periods of the supply and thus to achieve any desired heat control. The coupling unit with its associated pulsating direct-current supply, and the switch means are controlled from a sequence timer through a frequency control circuit. The control is such that at the will of an operator, currents of opposite polarity may be transmitted alternately through the primary of the welding transformer through the first and fourth and second and third groups of ignitrons, or currents of either polarity may be transmitted through the first and fourth or second and third.

It is desirable in the interest of flexibility that during each welding operation a preselected number of low-frequency impulses be supplied.

It is, accordingly, a further object of my invention to provide control apparatus for a welding system having facilities for determining the number of impulses of low-frequency current to be supplied for welding.

A further ancillary object of my invention is to provide a novel time-constant network.

A further ancillary object of my invention is to provide a novel timing circuit.

In accordance with my invention, these latter three objects are accomplished with a novel sequence timer including a circuit for discharging the capacitor which times the duration of the welding current, progressively in steps, the number of which may be determined at will. The discharging circuit is in this timer provided with an electric discharge device which is repeatedly turned on after each welding pulse.

In carrying out my invention, I have found that by introducing so-called flip-flop circuits in the proper places in the apparatus, the circuits for attaining many of the functions of the equipment are materially simplified. A flip-flop circuit is defined as a circuit usually including a pair of electric discharge devices, having a first condition in which one of the devices is conductive and prevents the other from being conductive, and a second condition in which the latter device is conductive and prevents the former from being conductive and which is capable of passing abruptly from one of these conditions to the other when a signal is impressed thereon. The electronic switch which selectively connects one or the other of the networks in the circuit units of the coupling unit is, according to my invention, operated by a flip-flop circuit. The direct current impressed in the control circuits of the auxiliary thyratrons in the circuit units to determine the heat control at which the power supply unit operates, is varied by two flip-flop circuits in accordance with my invention. A further flip-flop circuit cooperates with the sequence timer to determine the duration and character of the welding pulses.

It is an ancillary object of my invention to provide a novel flip-flop circuit particularly suitable for electronic control apparatus for a polyphase to single phase low-frequency welder.

By combining the novel power supply unit, as described above, with the novel heat-control circuit, the sequence timer, and the various flip-flop circuits, I have provided electronic control apparatus for a polyphase low-frequency welder. This control apparatus is highly flexible and is capable of operating at a high speed and of delivering pulses for welding of one polarity, alternately of one polarity and the opposite polarity, or of alternating polarities.

Figure 2A:
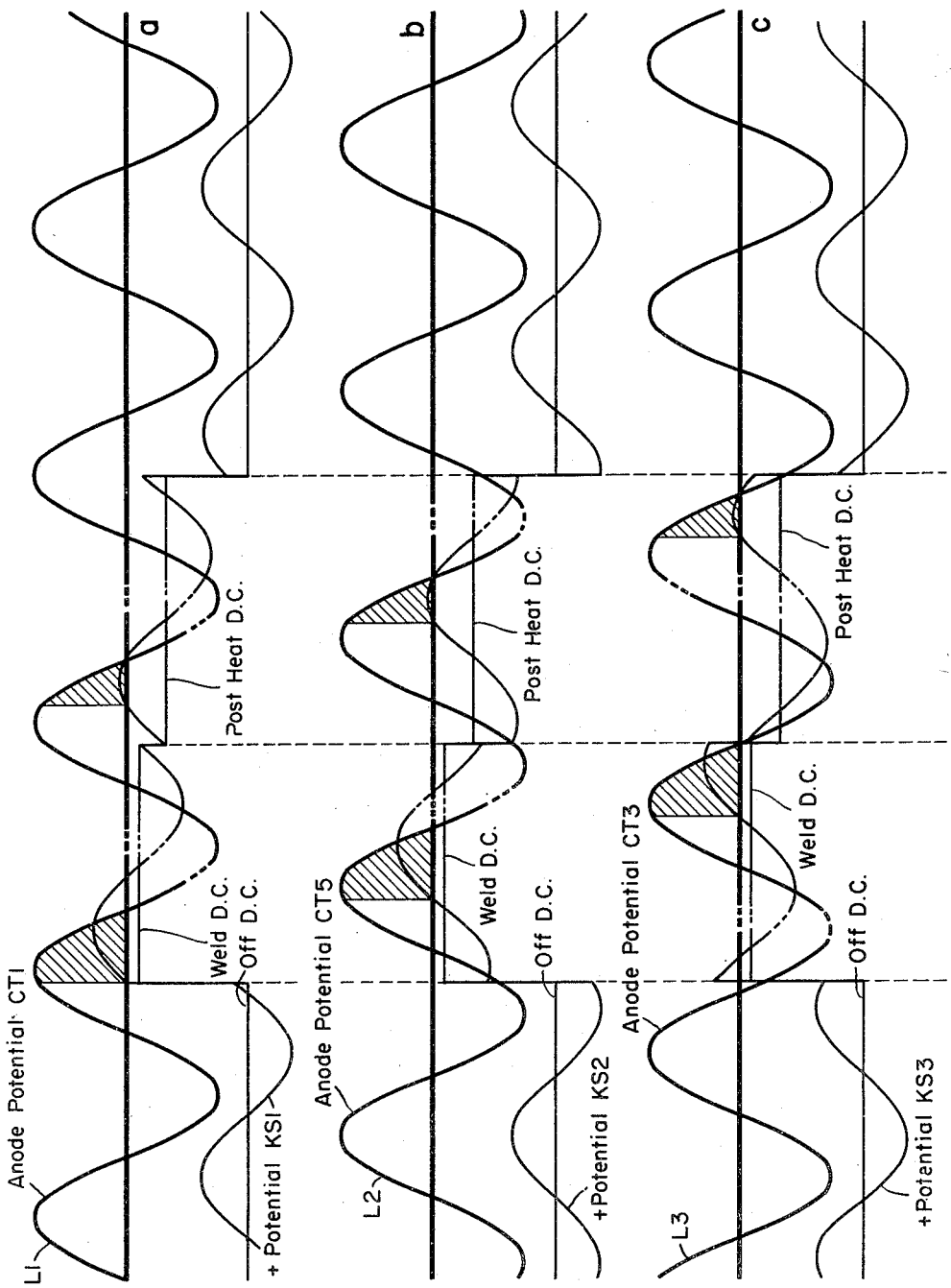
Figure 2B:
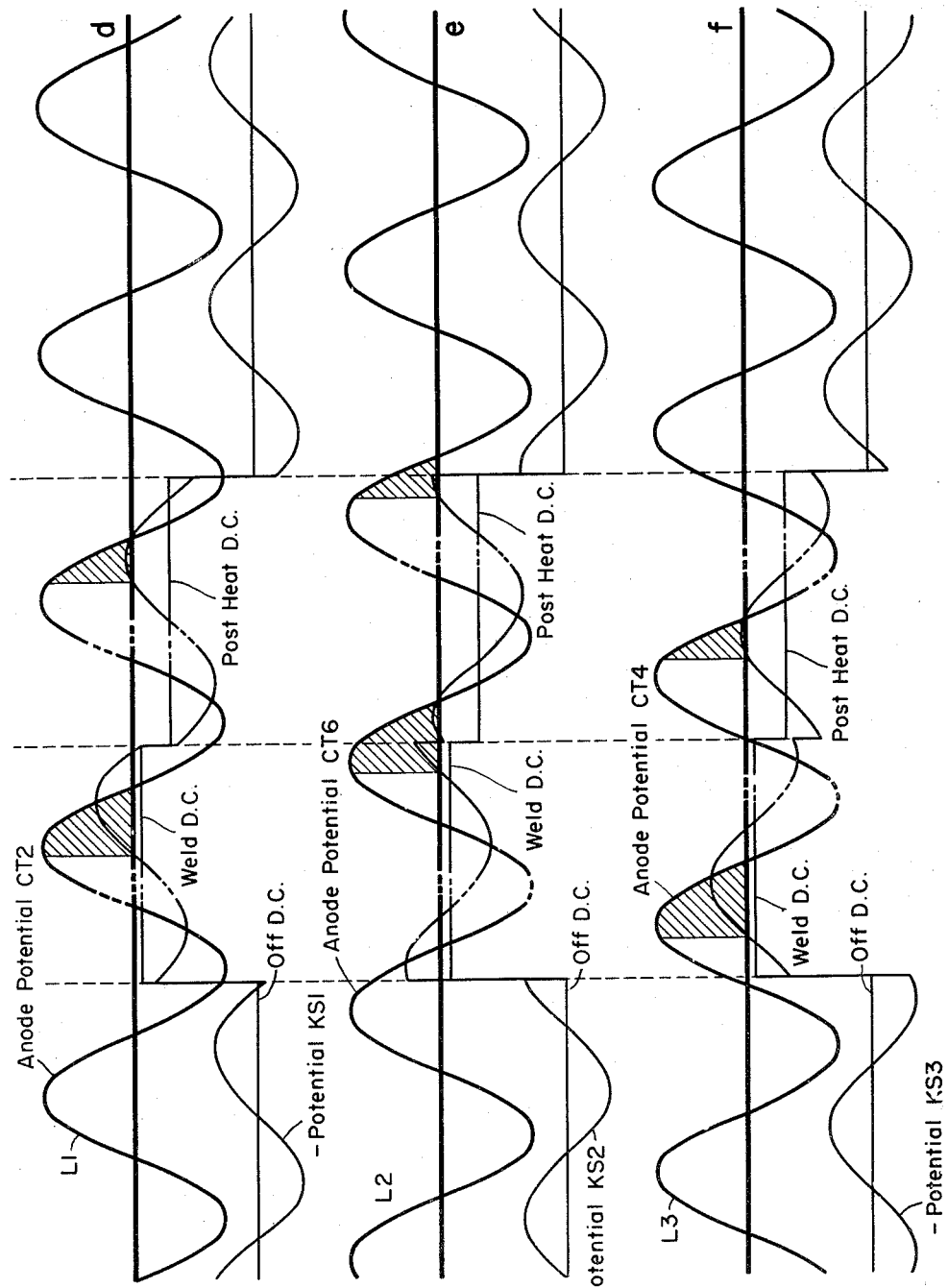

The features of my invention which I consider novel are set forth generally above. The invention itself, however, both as to its organization and its method of operation, together with additional objects and advantages thereof, will be understood from the following specific embodiment when read in connection with the accompanying drawings, in which:

Figure 1A is a block diagram of a preferred embodiment of my invention;

Figs. 1B to 1K together constitute a circuit diagram of my invention;

Figs. 2A and 2B together constitute a graph illustrating the operation of the heat-control circuit in accordance with my invention; and Figs. 3A and 3B and 4A and 4B together each constitutes graphs showing the various voltages and currents which flow during two sequences of operation in accordance with my invention.

Figure 6:
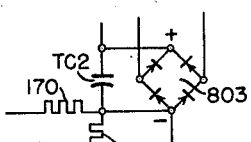

Figs. 5 and 6 show modifications of details of the disclosed circuit.

Description of Figs. 1A to 1K

The welding system shown in Figs. 1A to 1K consists of a Welder, a Power Supply Unit, a Coupling Unit, a Polarity Selector Unit, a Frequency and Heat-Control Unit, a Post-Heat Unit, a Sequence Timer and a Pulse-Counting Unit. Power for the system is derived from the buses or conductors L1, L2, L3 of a commercial three-phase source in which are connected three reactances RX1, RX2 and RX3, which absorb the effect of short circuits or commutation fluctuations of the type described in application Serial No. 272,818. These reactances may be lumped, or they may be the available regulation of the supply.

Figure 1K:
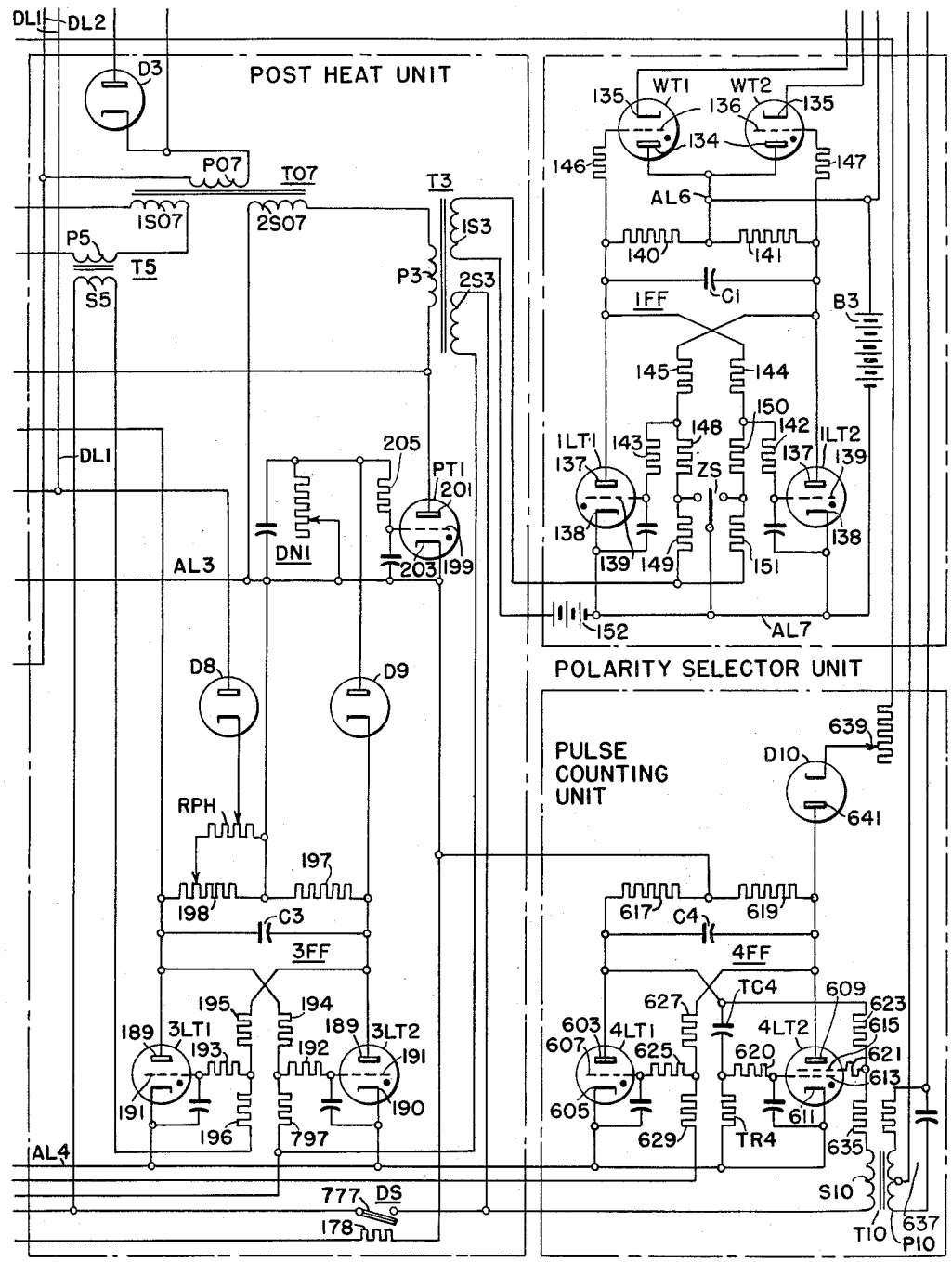
Figure 1J:
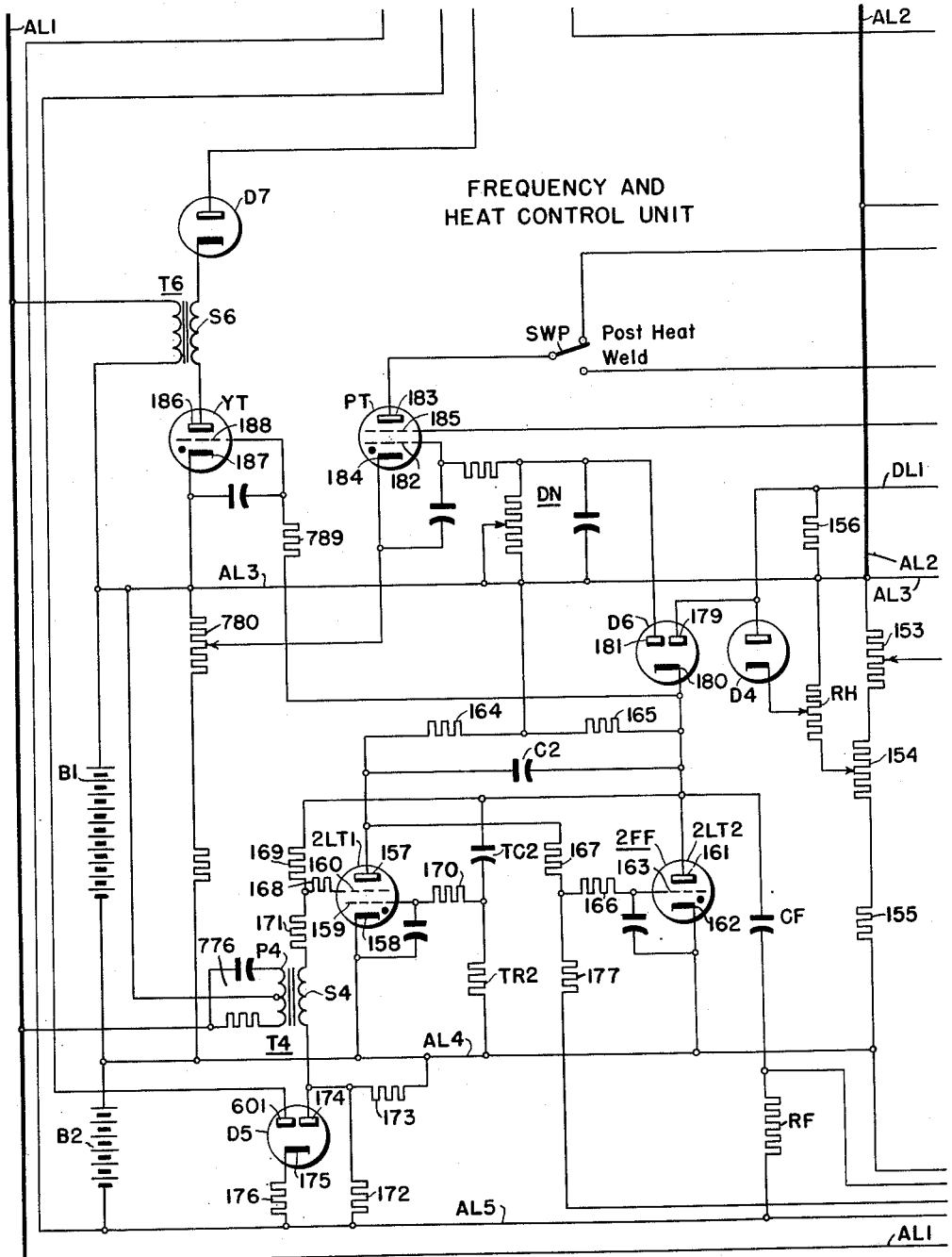

The power for welding is derived directly from these main buses L1, L2, L3. Alternating-current power for certain of the control components is derived from auxiliary buses AL1 and AL2, which are energized from the buses L1 and L2 through a transformer T1. Certain of the components of the system are energized from direct current derived from auxiliary buses AL3, AL4, AL5, AL6 and AL7. These buses are shown as connected across batteries B1, B2, and B3 (Figs. 1J and 1K). These batteries are symbolical of direct-current sources of any convenient type, which in the practice of my invention are usually rectifiers, connected to two of the buses of the supply and including suitable filters. Of the buses AL3, AL4, AL5, AL3 is most positive and AL5 most negative; of the other buses, AL6 is more positive than AL 7. Bus AL3 and alternating-current bus AL2 are at the same potential.

The Welder includes a welding transformer W having a single primary P and a secondary S, a pair of welding electrodes E1 and E2 connected to S, one of which, E1, is movable by a hydraulic cylinder C in and out of engagement with material M to be welded, a magnetically actuable valve V which controls the admission of fluid under pressure into the cylinder, and a pressure switch PS operated by a pressure relay PR which closes when adequate pressure is applied by the electrodes to the material M. Each of the windings P and S of the transformer W may be made up of a number of subwindings connected either in series or in parallel. The solenoid SV for the valve V is controlled from a starting relay SR having normally open contacts 19 and 21.

The Power Supply Unit includes a plurality of ignitrons I-1, I-2, I-3, I-4, I-5, I-6, I-7, I-8, I-9, I-10, I-11, and I-12. Each ignitron includes an anode 23, a cathode 25, and an igniter 27. These ignitrons may be divided into four groups which are connected between the supply buses L1, L2, and L3 and load buses AL8 and AL9, the latter being in turn connected to the terminals of the primary P.

The ignitrons of the first group are I-1, I-2 and I-3, and their anodes 23 are connected each to a supply bus L1, L2 and L3, respectively, while their cathodes are connected to the load bus AL9. The ignitrons of the fourth group are I-4, I-5 and I-6. The cathodes 25 of these ignitrons are connected to the buses L1, L2, and L3, respectively, while their anodes are connected to the load bus AL8. It is seen that the ignitrons I-1 to I-3 and I-4 to I-6 are so connected that current may be conducted upward through the primary P and through pairs of these ignitrons one from each group. Thus, when bus L1 is positive relative to L2, the conduction is through ignitrons I-1 and I-5. Depending on the relationship between the potential of the buses L1, L2 and L3, the other ignitrons conduct.

The second group of ignitrons are I-7, I-8 and I-9. The anodes 23 of the latter are connected each to a bus L1, L2, L3, respectively, and the cathodes 25 are connected to the load bus AL8. The third group is ignitrons I-10, I-11 and I-12, and their cathodes 25 are connected to the buses L1, L2 and L3, and their anodes 23 to the load bus AL9. The ignitrons I-7 to I-9, and I-10 to I-12, may thus conduct current downwardly through the primary P in pairs, one ignitrons from each group.

Each of the ignitrons I-1 to I-12 is provided with a firing thyratron FT1 to FT12. Each firing thyratron has an anode 29, a cathode 31 and a grid 33. Each anode 29 is connected directly to the anode 23 of the corresponding ignitron and the cathode 31 through a load resistor 35, 37, 39, 41, 43, 45, 47, 49, 51, 53, 55, 57 to the corresponding igniter 27. Each grid 33 is connected through a grid resistor 59, 61, 63, 65, 67, 69, 71, 73, 75, 77, 79, 81, and a pair of input resistors 83 and 85, 87 and 89, 91 and 93, 95 and 97, 99 and 101, 103 and 105, 107 and 109, 111 and 113, 115 and 117, 119 and 121, 123 and 125, 127 and 129 to a biasing supply 100, 102, 104, 106, 108, 110, 112, 114, 116, 118, 120, 122. Potential to fire the thyratrons FT1 to FT12 are impressed across the resistors 83 to 129 from the Coupling Unit.

The Coupling Unit includes a plurality of like circuit units each associated with a pair of ignitrons of the first and fourth group and a pair of ignitrons of the second and third groups of the Power Supply Unit. The pairs with which each circuit unit is associated are those which conduct simultaneously. Each unit includes a thyratron CT1 CT2, CT3, CT4, CT5 and CT6, each thyratron having an anode 130, a cathode 131, and a grid 132. The circuit units are supplied and controlled in pairs CT1—CT2, CT3—CT4, CT5—CT6.

The unit including thyratrons CT1 and CT2 are supplied from a transformer ST1, the primary SP1 of which is connected between the buses L1 and L2. These units control ignitrons I-1 and I-5, I-7 and I-11, I-2 and I-4, and I-8 and I-10, respectively, which are connected to the same buses L1 and L2. The supply potential for the units CT1 and CT2 is thus in phase with the supply potential for the associated ignitrons. Similarly, the circuit units including the ignitrons CT3 and CT4 are supplied from transformer ST2, the primary SP2 of which is connected across the buses L1 and L3. These units control associated ignitrons connected to the same buses. The units including the thyratrons CT5 and CT6 are controlled from a supply transformer ST3, the primary of which is connected between the buses L2 and L3. These units are related to associated ignitrons in the same manner as the other unit.

Each supply transformer ST1, ST2 and ST3 is provided with a pair of secondaries 1SS1, 2SS1, 1SS2, 2SS2, 1SS3, 2SS3, the supply secondaries 1SS1 and 2SS1, 1SS2 and 2SS2 and 1SS3 and 2SS3 of units supplied from the same supply transformers being oppositely wound so that the potentials derivable from these secondaries are in opposite phase. Thus, the potential derivable from the secondary 1SS1 is in opposite phase to the potential derivable from the secondary 2SS1.

Each circuit unit is provided with a pair of output transformers 1TO1 and 2TO1, 1TO2 and 2TO2, 1TO3 and 2TO3, 1TO4 and 2TO4, 1TO5 and 2TO5, 1TO6 and 2TO6. The primaries 1PO1 and 2PO1, 1PO2 and 2PO2, 1PO3 and 2PO3, 1PO4 and 2PO4, 1PO5 and 2PO5, and 1PO6 and 2PO6, of the transformers associated with each unit are connected together at one terminal. The other terminals of one group of primaries 1PO1, 1PO2, 1PO3, 1PO4, 1PO5 and 1PO6 are connected to a switching conductor or bus SL1 and the remaining terminals of the other primaries 2PO1, 2PO2, 2PO3, 2PO4, 2PO5, 2PO6 are connected to another switching conductor or bus SL2. The secondaries of the transformers 1TO1 to 1TO6 and 2TO1 to 2TO6 are connected across the resistors 83 to 129 in the control circuits of the firing thyratrons FT1 to FT12 of associated ignitrons I-1 to I-12. Thus, the secondary 1SO1 of transformer 2TO1 is connected across the resistor 85 in the control circuit of firing thyratron FP1; similarly, the secondary 5SO1 is connected across the resistor 101 in the control circuit of the firing thyratron FT5; the secondaries 2SO2 and 4SO2 are similarly connected to the firing thyratrons FT2 and FT4; the secondaries 4SO3 and 3SO3 to firing thyratrons FT4 and FT3; the secondaries 1SO4 and 6SO4 to firing thyratrons FT1 and FT6; the secondaries 2SO5 and 6SO5 to the firing thyratrons FT2 and FT6; the secondaries 3SO6 and 5SO6 to the firing thyratrons FT3 and FT6; the secondaries 7SO1 and 11SO1 to the firing thyratrons FT7 and FT11, the secondaries 8SO2 and 10SO2 to the firing thyratrons FT8 and FT10; the secondaries 9SO3 and 10SO3 to the firing thyratrons FT9 and FT10; the secondaries 7SO4 and 12SO4 to the firing thyratrons FT7 and FT12; the secondaries 8SO5 and 12SO5 to the firing thyratrons FT8 and FT12; and the secondaries 9SO6 and 11SO6 to the firing thyratrons FT9 and FT11. It is to be noted that the identifications of the secondaries of the output transformers above correspond to the thyratrons in the control circuits of which they are connected, the number at the beginning of the designation being the same as the number following the letters FT of the associated thyratron.

The units including the thyratrons CT1 to CT5 are completely alike. In each unit, the secondary of the associated supply transformer ST1 to ST3 is connected between the junctions of the primaries 1PO1 and 2PO1 to 1PO6 and 2PO6 of the output transformers and the anode 130 of the thyratron. Thus, the secondary 1SS1 of the first unit is connected to the anode 130 of the thyratron CT1 and to the junction of the primaries 1PO1 and 2PO1. The primaries thus constitute branch networks in series with the anode of the associated thyratron, and current may flow through one, 1PO1, or the other, 2PO1, depending on whether current is to be conducted through switching conductor SL1 or switching conductor SL2. The sixth circuit unit includes between the secondary 2SS3 of the supply transformer SP3 and the junction of the primaries 1PO6 and 2PO6, the primary PO7 of an additional output transformer TO7 and a diode D3, the diode being so connected as to permit current to flow from the anode 130 through the primary PO7 and either of the primaries 1PO6 and 2PO6 but to block the flow of current of the opposite polarity.

The circuit units are supplied with alternating control potential in pairs CT1, CT2; CT3, CT4; and CT5, CT6 through control transformers KT1, KT2 and KT3, respectively. The primaries KP1, KP2 and KP3 of these transformers are connected to different pairs of supply buses L1, L2 and L3 than the buses to which the corresponding supply transformers ST1, ST2 and ST3 are connected. Thus, the primary KP1 is connected to the buses L3 and L1, while the primary SP1 is connected to the buses L1 and L2; the primary KP2 to the buses L2, L3; and the primary SP2 to the buses L1, L3; and the primary KP3 to the buses L1, L2; and the primary SP3 to the buses L2, L3.

The secondaries KS1, KS2 and KS3 of the control transformers are each provided with an intermediate tap. The intermediate taps of the secondaries are connected together to one, DL1, of a pair of conductors DL1 and DL2 from which controlling direct current is derived. The terminals of each secondary are connected to the control electrodes 132 of the associated thyratrons; thus, the terminals of secondary KS1 are connected to the control electrodes 132 of the thyratrons CT1 and CT2, and the terminals of the secondaries KS2 and KS3 are similarly connected to the control electrodes of the thyratrons CT3 and CT4 and CT5 and CT6, respectively. The cathodes 131 of all of the thyratrons are connected to the conductor DL2. Thus, the controlling direct current is superimposed on the alternating potentials from the secondaries KS1 to KS3 in the control circuits of the thyratrons CT1 to CT6. The conductor DL2 is in turn connected to the conductors SL1 or SL2 through switch means which is included in the Polarity Selector Unit.

The anode circuits of the thyratrons CT1 to CT6 are thus completed through the switch means of the Polarity Selector Unit.

It is seen that the potential impressed between the control electrode and the cathode of each thyratron CT1 to CT6 from the associated secondary section of the secondaries KS1 to KS3 is displaced in phase with reference to the potential impressed between the anodes and the cathodes of the same thyratrons from the secondaries 1SS1 to 2SS3 by reason of the relationship of the phases of the potential derived from the buses L1, L2 and L3. The various windings of the supply and control transformers ST1 to ST3, and KT1 to KT3 are so related that the potentials impressed between the control electrodes 132 and the cathodes 131 of the thyratrons CT1 to CT6 lag the corresponding potentials impressed between the anodes 130 and cathodes 131 in phase preferably by approximately 60°.

The relationship between the anode-cathode and control-cathode voltages impressed on the thyratrons CT1 to CT6 is shown in Figs. 2 and 2A. In the graphs $a$ to $f$ plotted in these figures, potential is plotted vertically and time horizontally, and the various curves are labeled to correspond to the potentials which they represent. It is assumed that the time axes correspond to the critical potential of the thyratrons CT1 to CT6. The control of the thyratrons CT1 to CT6 is effected by varying the potential impressed between the buses DL1 and DL2. This potential is at any instant of the direct current type, but its magnitude is dependent on the desired operation of the apparatus at that instant. During certain intervals, the thyratrons CT1 to CT6 are to be non-conductive, and during these intervals, the potential on bus DL1 derived through the biasing resistors is highly negative with respect to the bus DL2. This condition is represented by the lines on the left in Figs. 2A and 2B which are well below the time axes and are labelled Off D. C. During these times, the alternating potential derived from the secondaries KS1 to KS3, which is superimposed on the negative direct potential does not rise to a sufficient amplitude to fire the thyratrons CT1 to CT6. This situation is represented in Figs. 2A and 2B.

At other times, when the thyratrons CT1 to CT6 are to be conductive, the direct-current potential impressed between conductors DL1 and DL2 is substantially more positive. At these times the thyratrons CT1 through CT6 are rendered conductive at instants in the periods of the supply determined by the magnitude of the D. C. potential. The higher the magnitude, the earlier in the periods of the supply the firing occurs. This condition is represented by the central and right-hand straight lines under the time axes in Figs. 2A and 2B which are labelled Weld D. C. and Post Heat D. C. It is seen that under these circumstances the curves representing the outputs of the secondaries KS1 to KS3 intersect the time axes (the critical potential) and the thyratrons CT1 to CT6 are rendered conductive.

The Polarity Selector Unit includes a pair of switching thyratrons WT1 and WT2 each having an anode 134, a cathode 135, and a control electrode 136. The cathode 135 of one thyratron WT1 is connected to the switching conductor SL1 in the Coupling Unit, and the cathode 135 of the other thyratron WT2 is connected to the switching conductor SL2. The anodes 134 of these thyratrons WT1 and WT2 are connected to the conductor DL2. When one or the other of the switching thyratrons WT1 and WT2 is conductive, the conductor SL1 or SL2, respectively, is connected to the bus DL2. It is seen that depending on which of the thyratrons is conductive, current is conducted either through primaries 1PO1, 1PO2, 1PO3, 1PO4, 1PO5, and 1PO6, or through primaries 2PO1, 2PO2, 2PO3, 2PO4, 2PO5 and 2PO6. The secondaries of the transformers of the first group of transformers 1TO1 to 1TO6 are connected in the control circuits of the firing thyratrons FT7 to FT12 of the ignitrons I–7 to I–12, and the secondaries of the transformers 2TO1 to 2TO6 of the other primaries are connected in the control circuits of the firing thyratrons of the ignitrons I–1 to I–6. Thus, depending on which of the switching thyratrons WT1 or WT2 is conductive, ignitrons I–7 to I–12, or I–1 to I–6 are conductive, and current of one polarity or of the opposite polarity flows through the primary P.

The switching thyratrons WT1 and WT2 are controlled from a flip-flop network 1FF. This network includes a pair of thyratrons 1LT1 and 1LT2 (or other discharge devices). Each thyratron 1LT1 and 1LT2 has an anode 137, a cathode 138, and a grid 139. The anodes 137 are connected each through an anode resistor 140 and 142 to the positive bus AL6. The cathodes 138 of the thyratrons 1LT1 and 1LT2 are connected together to the negative bus AL7. Between the anodes of the thyratrons, a commutating capacitor C1 is connected. The anode 137 of each thyratron 1LT1 and 1LT2 is also connected to the grid 139 of the other thyratron 1LT2 and 1LT1 through a grid resistor 142 and 143 and another resistor 144 and 145, respectively. The anode 137 of the thyratron 1LT1 is connected to the grid 136 of the switching thyratron WT1 through a grid resistor 146, and the anode 137 of the thyratron 1LT2 to the grid 136 of the switching thyratron WT2 through a grid resistor 147. The anodes 134 of the switching thyratrons are connected together to the bus AL6. The control electrodes 139 of both thyratrons 1LT1 and 1LT2 are connected through the grid resistors 143 and 142 and additional resistors 148, 149, 150 and 151 to one terminal of one of the secondaries 1S3 of a transformer T3. The cathodes 138 of both thyratrons are connected to the other terminal of this secondary 1S3 through a bias 152. The transformer T3 is located in the Post Heat Unit.

A switch ZS is provided for connecting the cathodes 138 of the thyratrons 1LT1 and 1LT2 to one or the other of the grids 139 of one or the other of the thyratrons 1LT1 or 1LT2 through one of the additional resistors 148 or 150 and the grid resistors 143 or 142 independently of the bias 152. This switch is operated to one position or the other when it is desired that the polarity of the current through the primary P be the same throughout a welding operation.

With switch ZS in the open position, the flip-flop circuit 1FF operates with one of the thyratrons 1LT2 or 1LT2 conductive; either may be initially conductive. The conductive thyratron connects the grid 136 of the associated switching thyratron WT1 or WT2 to the negative bus AL7, maintaining that switching thyratron non-conductive. The other thyratron, having its grid 136 connected to the positive bus AL6, is conductive. Thus, depending on the condition of the flip-flop circuit 1FF, one switching thyratron WT1 or WT2 or the other is conductive. When a pulse is delivered through secondary 1S3, the flip-flop circuit 1FF passes from one condition to the other, and the conductive thyratron 1LT1 or 1LT2 becomes non-conductive and the non-conductive thyratron 1LT2 or 1LT1 becomes conductive. The conductive thyratron WT2 or WT1 then becomes non-conductive, and the non-conductive thyratron conductive, and the polarity of the load current is reversed.

When switch ZS is closed in one position or the other, one of the thyratrons 1LT1 or 1LT2 remains conductive independently of the secondary 1S3, one of the thyratrons WT2 or WT1 remains conductive, and current of only one polarity flows through transformer W.

The resistors 144 and 145 connect the grids 139 of each thyratron 1LT1 and 1LT2 to the anode 137 of the other. During the transition when a non-conductive thyratron becomes conductive and a conductive one non-conductive, the grid of the thyratron which becomes conductive is raised to a positive potential. The cleanup of gas in the thyratrons by firing while the grid is negative is thus prevented. This is important where gas thyratrons such as the WL2050 are used.

The Frequency and Heat-Control Unit includes the circuit for delivering control potential which is supplied to the direct-current conductors DL1 and DL2 and a circuit for timing the frequency of the pulses delivered by the Power Supply Unit. The potential for the conductors DL1 and DL2 is derived from the direct-current buses or conductors AL3 and AL4. The conductor DL2 is connected to a variable resistor 153 which is connected in series with another variable resistor 154 and a fixed resistor 155 across these conductors. The conductor DL1 is connected through a biasing resistor 156 to the auxiliary conductor AL3. This conductor DL1 is also connected through a diode D4 and through a variable resistor RH which may be called the heat-control resistor to the variable resistor 154. Current is conducted through resistor 156 and the diode D4, variable resistors RH and 154, and resistor 155 from conductor AL3 to conductor AL4, and if unaffected by other components, the potential of conductor DL1 is negative with respect to conductor AL3 by an amount determined by the setting of the heat-control resistor RH. The conductor DL2 is also negative with respect to AL3 by an amount depending on the setting of variable resistor 153.

The magnitude of the direct-current potential impressed on the conductor DL1 is varied by a flip-flop circuit 2FF of a novel type constituting one of the features of my invention. This circuit includes a pair of thyratrons 2LT1 and 2LT2. The thyratron 2LT1 has an anode 157, a cathode 158, a first grid 159 and a second grid 160. The thyratron 2LT2 has an anode 161, a cathode 162, and a grid 163. The anodes 157 and 161 are connected through anode resistors 164 and 165 to the conductor AL2. A commutating capacitor C2 is also connected between the anodes. The cathodes are connected together to the conductor AL4. The anode 157 of thyratron 2LT1 is connected to the grid 163 of 2LT2 through a grid resistor 166 and an additional resistor 167. The anode 161 of thyratron 2LT2 is connected to the second grid 160 of the thyratron 2LT1 through a grid resistor 168 and an additional resistor 169. The anode 161 of thyratron 2LT2 is also connected to the first grid 159 of the thyratron 2LT1 through a timing capacitor TC2 and a grid resistor 170. The first grid 159 of thyratron 2LT1 is connected to the conductor AL4 through its grid resistor 170 and a charge and discharge resistor TR2 for the timing capacitor TC2. The second grid 160 of the thyratron 2LT1 is connected through its grid resistor 168, an additional resistor 171, the secondary S4 of a starting transformer T4, and still another resistor 172 to the negative conductor AL5. Resistor 172 is also connected to the conductor AL4 through another resistor 173.

A negative bias is thus impressed between the second grid 160 and the cathode 158 from the conductor AL5. This bias is increased by a branch network including a section 174—175 of a double diode D5 and a resistor 176 which shunts the resistor 172 connected to the conductor AL5 when this section of the diode D5 is conductive. The greater the conductivity of the section 174—175, the greater the negative bias impressed on the second grid.

The transformer T4 is of the type adapted to impress a potential of short duration compared to the periods of the supply and may be a so-called saturable transformer. Its primary P4 is connected between the conductors AL1 and AL2 through a phase-shift network 776. This network is so set that the potential derived from the secondary S4 lags the potential of the phase of conductors L1 and L2 by 60 degrees. The potential derived from the secondary S4 is of insufficient magnitude to render the thyratron 2LT1 conductive so long as the section 174—175 of diode D5 has its normal conductivity.

The grid of the thyratron 2LT2 is connected through the grid resistor 166, another resistor 177, the secondary 2S3 of the transformer T3, and the contacts 777 of a thermal delay switch DS to the negative conductor AL5. The heater 178 of this switch is heated from the buses AL1 and AL2. When power is initially turned on, the switch is open and the grid 163 is connected to the positive bus AL3 through the resistors 166, 167, and 164. The time taken by the contacts 777 to close is such that thyratron 2LT2 becomes conductive after power is turned on; this thyratron remains conductive after contact 777 closes in spite of the negative bias applied to grid 163 by conductor AL5. Since section 174—175 is normally conductive, thyratron 2LT2 remains conductive and initially timing capacitor TC2 is discharged.

During the operation, the flip-flop circuit 2FF changes from a condition in which the thyratron 2LT2 comducts to a condition in which the thyratron 2LT1 conducts. It is seen that when the thyratron 2LT1 becomes non-conductive, the timing capacitor TC2 is charged from the buses AL3, AL4 with its upper plate positive and its lower plate negative. Once thyratron 2LT1 becomes conductive, it remains conductive until a signal is impressed on grid 163 to counteract the bias from conductor AL5. When the thyratron 2LT2 again becomes conductive, it connects the upper plate of the capacitor TC2 to the negative bus AL4, and a negative bias is impressed between the grid 159 and the cathode 158 of thyratron 2LT1, holding the thyratron non-conductive in spite of any firing signals impressed on its other grid 160 until the charge leaks off the capacitor TC2. The timing capacitor thus functions to interpose a predeterminable time interval between the time the flip-flop circuit 2FF changes from the condition in which the thyratron 2LT2 is conductive to the condition in which the thyratron 2LT1 is conductive.

The anode 161 of thyratron 2LT2 is connected to the direct-current conductor DL1 through one section 179—180 of a double diode D6. When the thyratron 2LT2 is conductive, the cathode 180 of this double diode is substantially at the potential of conductor AL4, and the conductivity of this section of the diode D6 is high. Under such circumstances, the conductor DL1 has a high negative potential impressed thereon, and the thyratrons CT1 to CT6 are non-conductive.

When the flip-flop circuit 2FF changes to a condition in which thyratron 2LT2 is non-conductive, the cathode 180 of the double diode D6 is substantially at the potential of the conductor AL3, and the conductivity of this double diode is low. Under these circumstances, the potential of the conductor DL1 is more positive, being at the potential supplied through bias resistor 156 alone, and the thyratrons CT1 to CT6 conduct at instants in the periods of the supply determined by the setting of the heat-control resistor RH.

The other section 181—180 of the double diode D6 is connected to one of the grids 182 of another thyratron PT which may be called the pause thyratron since its firing starts the pause interval. This thyratron, in addition to the grid 182, has an anode 183, a cathode 184 and a second grid 185. The first grid 182 of the thyratron PT is connected to the cathode 184 through a time-constant network DN and variable resistor 780 which measures the duration of the welding current impulses. The anode of the thyratron PT may be connected through a selector switch SWP through the primary P5 of a transformer T5 and through one secondary 1SO7 of the transformer TO7 (which is supplied from the last of the circuit units, including the thyratron CT6), to the conductor AL3. It may also be connected selectively through the primary P3 and the secondary 2SO7 to the conductor AL3. The selection is effected by a switch SWP which in the first position sets the thyratron PT for operation at weld and post heat, that is, to start the pause interval after post heat, and in the second position sets the thyratron for operation at weld heat only, that is, to start the pause interval after weld only. The cathode of the thyratron PT is connected through a variable resistor 780 to the bus AL3 (AL3 and AL2 are connected together). The secondaries 1SO7 and 2SO7 thus supply anode potential for the thyratron PT, depending on the position of a switch SWP.

It is seen that so long as the flip-flop circuit 2FF is in the condition in which the thyratron 2LT2 is conductive, the capacitor of the network DN is charged, and the thyratron is non-conductive. When the flip-flop circuit 2FF passes from the condition in which the thyratron 2LT2 is conductive to the condition in which thyratron 2LT2 is non-conductive, the capacitor discharges. Thyratron PT may then conduct when anode potential is impressed thereon. Anode potential is impressed only when transformer TO7 is energized, and this occurs only when thyratron CT6 conducts, that is, at the end of any sequence during which the thyratrons CT1 to CT6 conducted in succession.

The Frequency and Heat-Control Unit includes still another thyratron YT. This thyratron has an anode 186, a cathode 187, and a grid 188. The cathode 187 is connected directly to the conductor AL3. The anode 186 is connected through the secondary S6 of a supply transformer T6 and through a diode D7 to the Sequence Timer. The grid 188 of this thyratron is connected to the anode 161 of the thyratron 2LT2 through a grid resistor 789. The thyratron YT is non-conductive so long as the thyratron 2LT2 is conductive because the latter connects its grid 188 to the negative bus AL4. Once thyratron 2LT2 becomes non-conductive, thyratron YT is conductive, and it remains conductive until 2LT2 again becomes conductive. While thyratron YT conducts, it transmits a synchronizing signal to the Sequence Timer which functions to prevent the Sequence Timer from starting an off time until the conduction of thyratron 2LT2 has signalled that the flow of weld current is to stop with the conduction of the last of the sequence of ignitrons to conduct.

The Post-Heat Unit operates to impress a negative bias potential larger than the bias potential already impressed by the Frequency and Heat-Control Unit on the conductor DL1. This potential is impressed through a diode D8 when the latter is conductive. This diode is connected to a flip-flop circuit 3FF of the same type as the circuit 1FF. The circuit 3FF includes a pair of thyratrons 3LT1 and 3LT2, each thyratron having an anode 189, a cathode 190, and a grid 191. The anode 189 of thyratron 3LT1 is connected to the conductor AL3 through a variable anode resistor 198. The anode 189 of thyratron 3LT2 is connected to the same conductor AL3 through an anode resistor 197. The cathodes 190 of the thyratrons 3LT1 and 3LT2 are connected together to the conductor AL4. Between the anode, a commutating capacitor C3 is connected. The anode 189 of one of each of the thyratrons 3LT1 and 3LT2 is connected to the grid 191 of the other 3LT2 and 3LT1 through a grid resistor 192 and 193 and an additional resistor 194 and 195. The grid of the thyratron 3LT1 is connected through the grid resistor 193, another resistor 196, and the secondary S5 of the transformer T5, to the negative conductor AL5. The grid of the thyratron 3LT2 is connected through the grid resistor 192, another resistor 797, the secondary 2S3, and the contacts 178 to the conductor AL5. The diode D8 is connected to the variable anode resistor 193 through another variable resistor RPH and to the bus DL1.

The contact 777 has the same effect on flip-flop circuit 3FF as it does on circuit 2FF. Accordingly, at the beginning of an operation after power is first turned on, the circuit 3FF is in a condition in which thyratron 3LT2 conducts and 3LT1 is non-conductive. The resistors 198 and RPH are so set that so long as the flip-flop circuit 3FF is in this condition in which the thyratron 3LT2 is conductive and 3LT1 is non-conductive, the diode D8 is non-conductive, and the potential of the conductor DL1 is not affected by the flip-flop circuit 3FF. When thyratron 3LT1 becomes conductive, the diode D8 conducts, and the potential of the bus DL1 is set by the variable resistors in circuit with the diode D8.

The Post-Heat Unit includes another diode D9 which is connected to the grid 199 of another thyratron PT1. This latter thyratron has, in addition to the grid 199, an anode 201, and a cathode 203. The anode 201 is connected to the cathode 203 (through conductors AL3), through the primary P3 of the transformer T3 and the secondary 2SO7. The anode potential supplied to the thyratron PT1 is then derived from the secondary 2SO7 and is impressed only when thyratron CT6 is conductive, that is, at the end of an interval during which the thyratrons CT1 through CT6 have completed a conduction cycle. The grid 199 of the thyratron PT1 is connected through a grid resistor 205 and a time-constant network DN1 to the cathode 203.

It is seen that so long as the thyratron 3LT2 conducts, the network DN1 is charged, and the thyratron PT1 is held non-conductive. Once the thyratron 3LT2 becomes non-conductive, the network DN1 discharges, eventually reaching a potential at which PT1 may become conductive. Thyratron PT1 is rendered conductive the next time that thyratron CT6 conducts, following the instant when the network DN1 is adequately discharged.

The anode 189 of the thyratron 3LT1 is also connected to the second grid 183 of the thyratron PT. So long as the thyratron 3LT1 conducts, a negative potential is impressed on the grid of the thyratron PT, and the latter is unable to conduct even if the network DN is discharged and potential is available at the secondary 1SO7 or 2SO7. The thyratron PT is thus interlocked with the Post-Heat Unit and can only start a pause interval if the Post-Heat Unit permits.

The Sequence Timer is generally similar to the Sequence Timer disclosed in application Serial No. 272,818. To the extent that this similarity exists, the components of the Sequence Timer will be identified by the same labels as in the Sequence Timer disclosed in the earlier-filed application.

The Sequence Timer includes a plurality of timing networks, among them a squeeze network SN, a weld network WN, a hold network HN and an off network ON. With these networks, thyratrons are associated, including a squeeze thyratron ST, a weld thyratron WT, a hold thyratron HT and an off thyratron OT. In addition, there are a plurality of auxiliary networks AN2, AN3, AN4, AN5 and auxiliary thyratrons AT2, AT3, AT4, AT5, AT6.

The squeeze thyratron has an anode 219, a cathode 221, and a grid 231. The anode circuit of this thyratron extends from the bus AL2 through the exciting coil of the starting relay SR, the anode 219 and the cathode 221 of the thyratron and the normally open contacts of a starting switch SW to the bus AL1. The grid 231 is connected to the off network through a grid resistor 235.

The weld thyratron WT has an anode 259, a cathode 260, a first grid 359 and a second grid 370. The anode-cathode circuit of this thyratron extends from bus AL2 through the primary P7 of an output transformer T7, the anode 259, the cathode 260 to the conductor AL1.

This transformer T7 initiates the welding operation. The secondary S7 of the transformer T7 is connected across the remaining section 601—175 of the diode D5 and resistor 176. It is seen that a potential impressed through secondary S7 across the section 601—175 raises the potential of the cathode 175 and reduces the current flow through resistor 173, reducing the bias on grid 160 to a magnitude at which the pulses from secondary S4 can render the thyratron 2LT1 conductive. The Sequence Timer, including this transformer, differs from the Sequence Timer of the earlier application in which the anode-cathode circuit is connected directly to the input impedances of the leading heat-control network.

The first grid 359 of the weld thyratron WT is connected through a grid resistor 364 to the auxiliary network AN4. The second grid 370 of the weld thyratron is connected through a grid resistor 372 to the auxiliary network AN5.

The hold thyratron HT includes an anode 376, a cathode 273 and a grid 271. The anode-cathode circuit of this thyratron extends from the conductor AL1 through the auxiliary network AN5, resistor 374, the anode 376, the cathode 273 of the hold thyratron, to the conductor AL2. The grid 271 of the hold thyratron HT is connected through a grid resistor 281 to the weld network.

The off thyratron OT includes an anode 237, a cathode 239 and a grid 287. The anode-cathode circuit of this thyratron extends from the bus AL1 through the starting switch SW, off network ON, a conductor 241, an anode resistor 242, the anode 237, the cathode 239, to the bus AL2.

The auxiliary thyratron AT2 includes an anode 317, a cathode 319 and a grid 321. The anode-cathode circuit of this thyratron extends from the bus AL2 through the network AN2, an anode resistor 315, the anode 317 and cathode 319 and the starting switch SW to the bus AL1. The grid 321 of this thyratron is connected through a grid resistor 325 to the off network ON.

The thyratron AT3 has an anode 335, a cathode 305 and a grid 311. The anode-cathode circuit of this thyratron extends from the bus AL1 through the squeeze network SN, an anode-resistor 333, the anode 335, the cathode 305 to the conductor AL2. The grid 311 of this thyratron is connected through a grid resistor 313 to the network AN2.

The thyratron AT4 includes an anode 341, a cathode 339 and a grid 337. The anode-cathode circuit of this thyratron extends from the bus AL2 through the network AN3, an anode-resistor 340, the pressure switch PS which is open in the quiescent condition of the apparatus, and the anode 341, the cathode 339 to the bus AL1. The grid 337 of the thyratron AT4 is connected through a grid resistor 257 to the squeeze network SN.

The thyratron AT5 has an anode 353, a cathode 347 and a grid 351. The anode-cathode circuit of this thyratron has two branches. One branch extends from the conductor AL1 through the network AN4, the section 362, 354 of the diode D2, an anode-resistor 356, the anode 353, the cathode 347 to the conductor AL2. The other branch extends from the secondary S1 of a supply transformer T1 through the section 352—354 of the diode D2, the anode-resistor 356, the anode 353, the cathode 347, the weld network WN to the secondary S1. The grid 351 of the thyratron AT5 is connected through a grid resistor 349 to the network AN3.

Thyratron AT6 includes an anode 371, a cathode 367 and a first grid 365 and a second grid 428. The anode and cathode of this thyratron are connected in a circuit extending from the conductor AL2 through the hold network HN and anode resistor 369, the anode 371, the cathode 367, to the conductor AL1. The first grid of this thyratron is connected through a grid resistor 363 to the network AN5. The second grid is connected directly to the cathode in the repeat position of the repeat-non-repeat switch SRN. In the non-repeat position, it is connected to the off network through a grid resistor 430.

The anode 186 and cathode 187 of the synchronizing thyratron YT are connected through the diode D7 to the hold network HN. So long as the thyratron YT is conductive, the hold network is charged, and thus the timing out of the hold time is not initiated. Thus, the termination of the welding impulse is not signalled until the thyratron 2LT2 of the flip-flop network 2FF becomes conductive. A complete cycle of conduction of the thyratron CT1 to CT6 must then be completed before the hold time can start. This function of the synchronizing thyratron YT constitutes another difference between the sequence timer disclosed herein and that disclosed in the earlier application No. 272,818.

A further and important difference involves the weld network. The discharge of this network takes place incrementally in steps and not continuously. This manner of discharge makes possible the transmission of a predetermined number of individual current pulses by the power supply unit. For this purpose the weld network is interconnected with the Pulse Counting Unit.

The Pulse Counting Unit includes another flip-flop circuit 4FF similar to my novel circuit 2FF. This circuit includes a pair of thyratrons 4LT1 and 4LT2. The thyratron 4LT1 has an anode 603, a cathode 605, and a grid 607. The thyratron 4LT2 has an anode 609, a cathode 611, a first grid 613 and a second grid 615. The anodes 603 and 609 of the thyratrons 4LT1 and 4LT2 are connected through anode resistors 617 and 619 to the conductor AL3. The cathodes 605 and 611 are connected together to the conductor AL4. The anodes are also connected together through commutating capacitor C4. The anode 603 of the thyratron 4LT1 is connected to the first grid 613 of the thyratron 4LT2 through a timing capacitor TC4 and a grid resistor 620. The anode 603 of the thyratron 4LT1 is also connected to the second grid 615 of the thyratron 4LT2 through a grid resistor 621 and another resistor 623. The anode 609 of the thyratron 4LT2 is connected through a grid resistor 625 and another resistor 627 to the grid 607 of the thyratron 4LT1. The grid 607 of thyratron 4LT1 is connected through its grid resistor 625, another resistor 629 and the resistor RF of a differentiating circuit to the negative bus AL5. The differentiating circuit includes the capacitor CF which is connected to the anode 157 of the thyratron 2LT2. It is seen that when the thyratron 2LT1 becomes non-conductive, a positive pulse is impressed across resistor RF in the grid circuit of thyratron 4LT1. The first grid 613 of the thyratron 4LT2 is connected through the grid resistor 620 and another resistor 633 to the bus AL4. The second grid 615 is connected through the grid resistor 621, another resistor 635 and the secondary S10 of a peaking transformer T10 to the thermal contact 777. The primary P10 of this transformer is supplied from the bus L1 and L2 through a phase-shift network 637. The network 637 may be set so that an impulse is supplied from the secondary S10 at any desired instant in the positive half period of the potential from L1—L2. Usually the setting is for ⅙ period after the instant of zero potential.

The anode of the thyratron 4LT2 is connected through diode D10 and a variable resistor 639 to the capacitor 265 of the weld network WN. This capacitor is connected at its other terminal to the conductor AL3 which is in turn connected to the anode 641 of the diode D10 through the anode resistor 619 of thyratron 4LT2. It is seen that if the diode D10 is conductive, the capacitor of the weld network WN may discharge.

When the supply switch or circuit breaker for the apparatus is closed, the switch DS is initially open for a short time, and, therefore, initially thyratron 4LT2 is conductive and the anode of the diode D10 is substantially negative so that this diode is non-conductive. The capacitor 265 in the weld network WN is then prevented from discharging. Thyratron 4LT1 being initially non-conductive, capacitor TC4 is initially charged.

Stand-by for Figs. 1A to 1K

The control apparatus may be operated so that each of a series of individual welds is produced with a single pulse or each is produced with a plurality of pulses of the opposite polarity. The former operation is desirable in situations in which the material M to be welded is of such thickness that, for the welding transformer available, the material can be welded with a single pulse. If the material is so thick as to require a pulse of long duration, the welding transformer may saturate, and a weld with a single pulse is not feasible. In such situations, it may be desirable to produce a weld with a plurality of pulses. Where single pulse welds are produced, the welding current and the post-heat current constitute components of this pulse. Under such circumstances, the apparatus is set with the weld-post-heat switch SWP for post heat. Where the material requires a plurality of pulses of opposite polarity, the individual pulses are set to build up the welding heat only, and the weld-post-heat switch SWP is set in the weld position. With the switch set for post heat, the thyratron PT is capable of conducting through primary P5 of transformer T5 and its anode potential is supplied from the secondary 1SO7. With the switch set for weld only, the anode circuit of the thyratron PT is connected through primary P3 of transformer T3 and its anode potential is supplied by secondary 2SO7. It will be seen that in either case the thyratron PT is initially non-conductive.

To set the system for operation, the power switch or circuit breaker for the apparatus is closed. On the closing of this switch, the cathode heaters (not shown) of the thyratrons are heated, and the heating of the thermal relay DS starts. Initially, the thermal switch 777 is open and the grids 163, 191 and 609 of the thyratrons 2LT2, 3LT2 and 4LT2 are connected in effect to their anodes. These thyratrons then become conductive. In addition, one of the thyratrons of the polarity selector unit becomes conductive. This thyratron is selected at random and may be assumed to be 1LT1; thyratron WT2 is then conductive and WT1 non-conductive. Since thyratron 2LT2 is conductive, bus DL1 is about at the negative potential of the bus AL4, and the thyratrons CT1, CT2, CT3, CT4, CT5 and CT6 are non-conductive. The corresponding thyratrons FT1 to FT12 and their associated ignitrons I-1 to I-12 are also nonconductive.

Since the thyratron 2LT2 is conductive, the network DN is charged and the thyratron PT is maintained non-conductive, regardless of the position of the weld-post-heat switch SWP. In addition, the synchronizing thyratron YT is also maintained non-conductive.

Since the thyratron 3LT2 is conductive, 3LT1 is non-conductive, and the diode D8 is blocked so that it does not affect the potential of DL1. Since the thyratron 3LT2 is conductive, the network DN1 is charged, and the thyratron PT1 is maintained non-conductive.

Since the thyratron 4LT2 is conductive, the thyratron 4LT1 is non-conductive, and the diode D10 is blocked so that the capacitor in the weld network WN is not capable of discharging.

The Sequence Timer is in the same stand-by condition as the corresponding Sequence Timer of the earlier application Serial No. 272,818. The squeeze thyratron ST and the auxiliary thyratron AT2 are non-conductive because their anode circuits are maintained open at the starting switch SW. The auxiliary network AN2 is discharged, and auxiliary thyratron AT3 is conductive, maintaining the squeeze network SN charged. The auxiliary thyratron AT4 is maintained non-conductive because the squeeze network SN is charged and also because the pressure switch PS is open. The auxiliary network AN3 is then discharged, permitting the auxiliary thyratron AT5 to conduct. Through one of its branches 362—354, the auxiliary thyratron AT5 charges the auxiliary network AN4, maintaining the weld thyratron WT non-conductive. Through its other branch 352—354, the auxiliary thyratron AT5 charges the capacitor 265 in the weld network WN. Because the weld network WN is charged, the hold thyratron HT is non-conductive, and the auxiliary network AN5 is discharged. The auxiliary thyratron AT6 is then conductive, charging the hold network HN to maintain the off thyratron OT non-conductive. The off network ON is then at this point uncharged.

*Operation of Figs. 1A to 1K—one pulse per weld—with post heat*

Figure 3A:
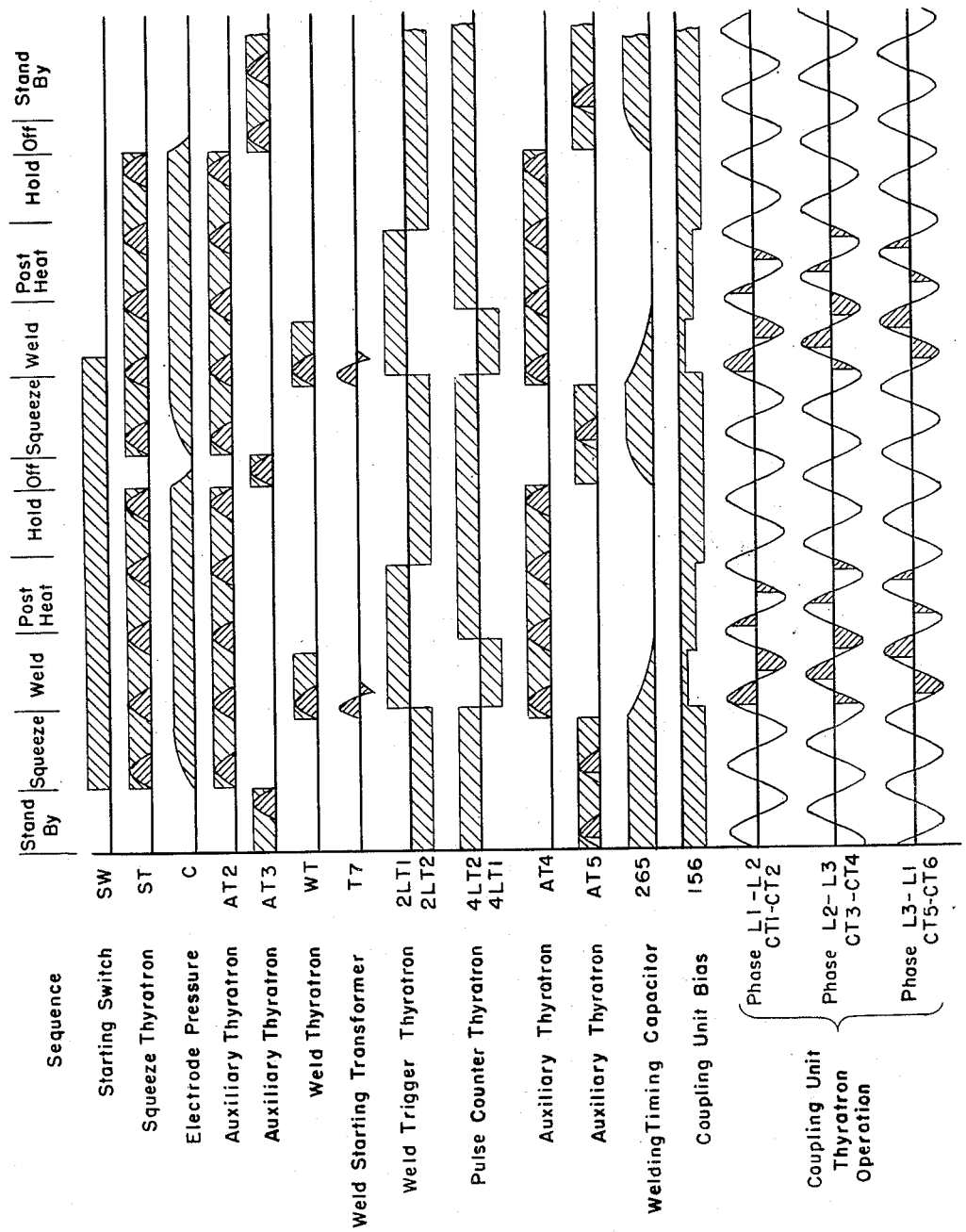
Figure 3B:
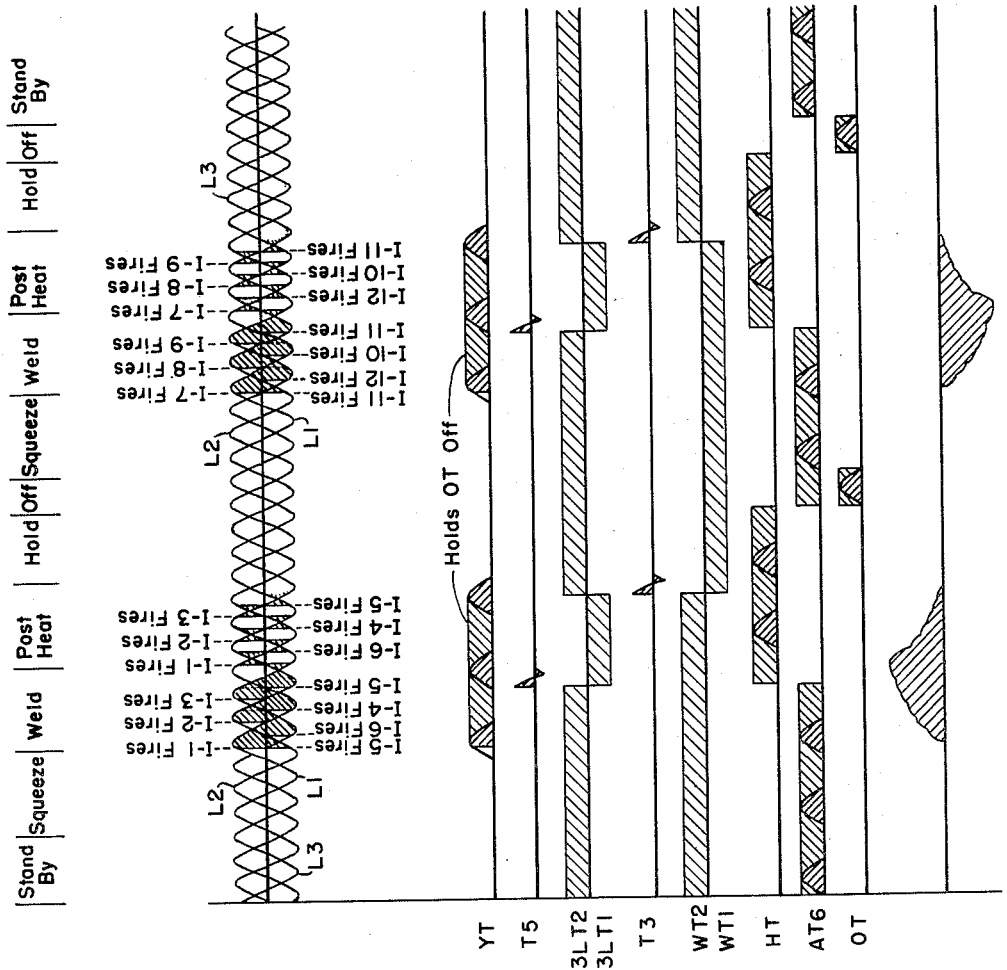

The operation will be first considered with the post-heat switches SWP in the post-heat position, that is, with the thyratron PT connected in the circuit including the secondary 1SO7 and primary P5. This mode of operation is customarily adopted where each weld is produced with a separate pulse. The sequence of operations of this mode of operation can be seen from Figs. 3A and 3B. Figs. 3A and 3B present the condition of the various thyratrons, ignitrons and transformers sequentially during two complete welding operations with the switch SWP in the post-heat position. In each of the graphs of Figs. 3A and 3B, time is plotted horizontally and voltage or current vertically; the conduction of the various thyratrons and ignitrons and the transmission of power through the various transformers is illustrated shaded. The stand-by condition of the apparatus, as described above, is presented under the heading Stand-by on the extreme left and on the extreme right, it being assumed that the apparatus is reduced to stand-by after the completion of the two welds. The other phases of the two cycles of operation are presented in sequence from left to right.

To carry out a welding operation, the material is disposed between the electrodes, and the start switch SW is closed. The squeeze thyratron ST is then rendered conductive, energizing the start relay SR. At its lower contact 19, the start relay closes the circuit through the pressure solenoid valve SV, and pressure is applied to the movable electrode E1, causing it to engage the work M in preparation for a weld. At the upper contact 21, the Sequence Timer is locked in.

The closing of the start switch SW also causes the auxiliary thyratron AT2 to become energized. The auxiliary network AN2 is then charged immediately causing the auxiliary thyratron AT3 to become non-conductive. The squeeze network SN then begins to discharge. During this discharge time, the electrode E1 is properly seated on the work, and the pressure switch PS is closed, closing the circuit through auxiliary thyratron AT4. At the end of this squeeze time, the squeeze network SN discharges sufficiently to permit auxiliary thyratron AT4 to conduct. This thyratron now conducts, charging the network AN3 and immediately causing the auxiliary thyratron AT5 to become non-conductive and stops the charging of network AN4.

The weld thyratron WT now conducts, transmitting a current pulse through the transformer T7. The charging of the weld network capacitor is also stopped by the non-conduction of thyratron AT5 but the weld-network capacitor 265, cannot discharge because the discharge circuit is maintained open by the diode D10.

The pulse transmitted through the secondary S7 of the transformer T7 by the weld thyratron reduces the current flow through the resistor 173 to permit the thyratron 2LT1 to conduct. This thyratron becomes conductive at an instant in the positive half-period of the potential of buses L1, L2, following the zero instant by approximately ⅙ of a period. Once thyratron 2LT1 conducts, thyratron 2LT2 is rendered non-conductive by the operation of the commutating capacitor C2. The diode D6 now becomes non-conductive, and the negative potential of the bus DL1 is abruptly decreased. The thyratrons CT1 through CT6 may now conduct at instants in the corresponding half-periods of the supply determined by the setting of the heat control variable resistors RH.

In addition when thyratron 2LT2 is rendered non-conductive, a pulse is transmitted through the differentiating circuit CF-RF connected to the anode of thyratron 2LT2 to render thyratron 4LT1 conductive. Thyratron 4LT2 now becomes non-conductive, and the anode of diode D10 becomes positive so that it may conduct. The capacitor 265 in the weld network WN is now discharged to an extent depending on the setting of the resistor 639 in the discharge circuit. The discharging persists for a time interval determined by the magnitudes of resistor TR4 and capacitor TC4. This capacitor and resistor are so set that after a predetermined time interval the capacitor is discharged sufficiently to permit thyratron 4LT2 to conduct again and the discharging of capacitor 265 to stop.

The weld thyratron is rendered conductive during a half-period during which bus L1 is positive with respect to bus L2. The thyratron 2LT1 is then rendered conductive ⅙ of a period after the zero instant of this positive half-period, and the more positive potential is at this instant applied to the bus DL1. At this time, positive potential from the buses L1, L2 is impressed on the thyratron CT1, and this thyratron is first rendered conductive. Since at this time the thyratron WT2 is conductive, current is transmitted through the output primary 2TO1, and firing pulses are transmitted through the secondaries 1SO1 and 5SO1.

The firing thyratrons FT1 and FT5 are now simultaneously rendered conductive, and current flows from bus L1 through ignition I–1, bus AL9, upward through the primary P, bus AL8, ignitron I–5 to bus L2. The conduction of thyratron CT1 is shown in Figs. 2 and 2A by the shading under the sine wave of curve (a). As can be seen, this thyratron is rendered conductive relatively early in the half-period of the potential of the buses L1, L2.

One-sixth of a cycle later, the thyratron CT4 is rendered conductive, as shown in the lowest curve (f) of Figs. 2A and 2B. Thyratron CT4 transmits current through the transformer 2TO4. A pulse is now transmitted through the secondary 6SO4, and thyratron FT6 and ignitron I–6 are rendered conductive. For an instant, current flows through the ignitrons I–1, I–5 and I–6, but at this time bus L3 has become more negative with respect to the other buses, and ignitron I–5 becomes non-conductive and current flows upward through the primary P from bus L1 to bus L3 through ignitrons I–1 and I–6.

A sixth of a period later, thyratron CT5 is rendered conductive, (curve b, Figs. 2A, 2B) and current flows through transformer 2TO5. A pulse is impressed through the secondary 2SO5 to fire ignitron I–2. At this time, bus L2 is becoming positive with respect to bus L1, and ignitron I–1 becomes non-conductive. Current now flows through buses L2 and L3 upward through primary P through ignitrons I–2 and I–6.

As can be seen from curve (d) of Figs. 2A and 2B, thyratron CT2 is now rendered conductive ⅙ of a period later, conducting current through transformer 2TO2 and transmitting a pulse to fire ignitron I–4. Current then flows upward through the primary P from bus L2 to bus L1 through ignitrons I–2 and I–4. One-sixth of a period later, thyratron CT3 is rendered conductive (curve c, Figs. 2A, 2B), causing current to flow through transformer 2TO3, firing ignitron I–3, through secondary 3SO3. Current now flows from bus L3 to bus L1 upward through the primary P through ignitrons I–3 and I–4. Finally thyratron CT6 is rendered conductive (curve e, Figs. 2A, 2B), causing current to flow through the transformer 2TO6 and a pulse is transmitted through secondary 5SO6 to render ignition I–5 conductive. Current now flows between buses L3 and L2 through ignitrons I–3 and I–5 upward through the primary P.

The apparatus has now completed one complete cycle of operation. Unless a change occurs in the potential impressed on the bus DL1, another cycle similar to the one just described is produced. As it happens in the actual operation illustrated in Figs. 3A and 3B, another change does occur. This change will now be described.

It will be remembered that flip-flop circuit 2FF passed from a condition in which the thyratron 2LT1 was non-conductive and 2LT2 conductive, to a condition in which 2LT2 became non-conductive and 2LT1 conductive. Under such circumstances, the charging of the network DN was interrupted, and it began to discharge. At this time thyratron 3LT1 is non-conductive so that the second grid of thyratron PT is positive and it can conduct as soon as network DN permits. When the thyratron CT6 is rendered conductive during the first cycle of operation, it transmits a pulse not only through the primary 2PO6 of transformer 2TO6 but also through the primary PO7 of transformer TO7. A pulse is then impressed through the secondary 1SO7 in the anode circuit of thyratron PT. It happens that the network DN is so set that this first pulse fires the thyratron PT.

It is to be understood that the firing of the thyratron PT at the end of the first cycle of operation of the thyratrons CT1 to CT6 is only illustrative. The network DN may be set so that the thyratron PT is fired after several cycles of operation of the thyratrons CT1 to CT6.

When thyratron PT conducts, it transmits current through the primary P5 of the transformer T5 impressing a pulse in the secondary S5 which renders thyratron 3LT1 of the third flip-flop circuit 3FF conductive. The commutating capacitor C3 then causes the thyratron 3LT2 to become non-conductive. Since the thyratron 3LT1 is conductive, the diode D8 conducts, and the potential of the bus DL1 becomes more negative by a magnitude corresponding to the setting of the variable resistor RPH. This condition is represented in Figs. 2A and 2B by the line labeled Post Heat D. C. of each graph. When thyratron 3LT1 of the post-heat unit is rendered conductive, it applies a negative potential to the grid 185 of thyratron PT, preventing the latter from again becoming conductive when thyratron CT6 is rendered conductive at the end of each post-heat cycle. The thyratron PT is thus prevented from causing improper operation by false firing.

The change above described occurred while ignitrons I–3 and I–5 were conducting to complete the cycle. One-sixth of a period has now elapsed since ignitron I–5 was last rendered conductive and bus L1 is now becoming positive with respect to bus L2. The current flow through the primary P in the upward direction now decreases gradually for a fraction of a period, but eventually, depending on the setting of the variable resistor RPH, thyratron CT1 is fired. This thyratron is fired later in the period of supply than during the first cycle of operation, as can be seen from curve a of Figs. 2A and 2B.

Ignitron I–1 is now fired through secondary 1SO1, and ignitron I–3 becomes non-conductive. Current now flows through ignitron I–1 upward through the primary P and to the ignitron I–5. This current is substantially smaller than that originally transmitted, and the current flowing in the primary tends to decrease. One-sixth of a period later, thyratron CT4 is fired causing ignitron I–6 to fire. Current then flows as before through ignitrons I–1 and I–6 upward through the primary P. One-sixth of a period later, thyratron CT5 fires firing ignitron I–2 and causing current to flow through ignitrons I–2 and I–6. Thereafter, ⅙ of a period later, thyratron CT2 is fired causing ignitron I–4 to fire, and current is transmitted through ignitrons I–2 and I–4. Next, thyratron CT3 fires firing ignitron I–3; current then flows through ignitrons I–3 and I–4. Finally, thyratron CT6 fires firing ignitron I–5 and causing current to flow through ignitrons I–3 and I–5.

When thyratron CT6 fires, a pulse is again transmitted through primary PO7 of transformer TO7. Anode potential is then supplied to the thyratron PT1.

When thyratron 3LT2 was rendered non-conductive, the charging of the network DN1 was stopped. This network then discharged. While the network DN1 can be set to provide several full cycles of post heat, it happens that it is so set as to permit thyratron PT1 to become conductive after the last described one cycle of operation when the pulse in its anode circuit is impressed through the secondary 2SO7 of transformer TO7. Thyratron PT1 then conducts, transmitting a pulse through primary P3 of transformer T3 through the secondary 1S3 of this transformer. A pulse is impressed in the control circuit of the thyratrons 1LT1 and 1LT2 of the flip-flop circuit 1FF. The thyratron 1LT2, which had been nonconductive, now becomes conductive and thyratron 1LT1, which had been conductive, now becomes non-conductive. Thyratron WT2 is now rendered non-conductive, the thyratron WT1 is now rendered conductive. The coupling unit is now set so that current may flow through the transformers 1TO1, 1TO2, 1TO3, 1TO4, 1TO5, and 1TO6, but as will be seen, current does not, for the moment, flow.

Through the secondary 2S3 of transformer T3, a pulse is impressed to render thyratron 2LT2 conductive. The latter becomes conductive, and thyratron 2LT1 becomes non-conductive. Thyratron 2LT1 is now prevented from immediately becoming conductive, although current may flow through the transformer T7 by the timing capacitor TC2, which is connected through the thyratron 2LT2 to the bus AL4, and applies a negative bias to the grid 159 of thyratron 2LT1. This capacitor discharges through the resistor TR2, and until it reaches a predetermined potential, thyratron 2LT1 is unable to fire.

When thyratron 2LT2 becomes conductive, the potential of bus DL1 is decreased to its original negative value, (corresponding of the lines on the left labeled OFF D. C. of curves *a* to *f* of Figs. 2A and 2B) and the thyratrons CT1 to CT6 and their associated ignitrons are now prevented from again becoming conductive. The current through the primary P now decays to zero. This decay is shown in the lowest graph of Figs. 3A–3B which represents the current flow through the secondary of the welding transformer.

Since a single weld is produced by each pulse, the capacitor 265 is set so that it discharged sufficiently while thyratron 4LT2 was non-conductive to permit the hold thyratron HT to become conductive. (See page 39, last paragraph.) The hold thyratron now becomes conductive, charging the auxiliary network AN5 and causing the auxiliary thyratron AT6 to become non-conductive. The hold network HN now discharges during the hold time. The discharge, however, does not start until the synchronizing thyratron YT has become non-conductive. Since this thyratron is connected to the anode of thyratron 2LT2, it can only become non-conductive when the latter has become conductive. Thus, the thyratron YT prevents the start of the hold time until the welding current has stopped flowing, as manifested by the operation of the flip-flop circuit 2FF, in spite of the fact that the capacitor 265 may have timed out before the end of this interval.

Once hold network HN is permitted to discharge, it discharges, and at the end of the hold interval, the off thyratron OT is rendered conductive to charge the off network ON. The squeeze thyratron ST and auxiliary thyratron AT2 are now rendered non-conductive de-energizing the relay SR for the valve solenoid SV and permitting the electrode E1 to be retracted from the material M. The material can now be advanced for another weld.

The auxiliary network AN2 now discharges, permitting thyratron AT3 to become conductive and to reset the squeeze network SN. The thyratron AT4 is rendered non-conductive when the pressure switch PS is opened by the retraction of the pressure relay PR. The auxiliary network AN5 immediately discharges permitting the thyratron AT5 to become conductive and to recharge the auxiliary network AN4 so that the weld thyratron WT is held non-conductive independently of the network AN5. The weld network is also reset through the auxiliary thyratron AT5. Because the weld network WN is charged, the hold thyratron HT becomes non-conductive, permitting the auxiliary network AN5 to discharge and the auxiliary thyratron AT6 to become conductive, resetting the hold network HN. The off thyratron OT now becomes non-conductive, and the off network ON may discharge. If the switch SW remains closed, corresponding to the first curve of Figs. 3A and 3B, another welding cycle is repeated after the off network discharges sufficiently to permit the thyratrons ST and AT2 to again conduit. The second cycle of operations is similar to the first cycle except that as shown in Figs. 3A–3B the welding current is the opposite polarity. This polarity reversal is produced because thyratron WT1 is now conductive rather than WT2 and firing pulses are transmitted in succession through transformers 1TO1 to 1TO6. The secondaries of these transformers are connected to fire ignitrons I–7 through I–12 and to conduct current downward through the primary P.

*Operation of Figs. 1A to 1K—several pulses per weld— weld only*

Where several low-frequency pulses of alternately opposite polarity are to be transmitted for welding, the weld network WN is set to count this number of pulses. Under such circumstances each of the pulses preferably is set for weld only since the weld is produced by a plurality of these pulses. The switch SWP then is set for Weld. This operation which is shown graphically in Figs. 4A and 4B will now be described.

It is to be noted that if alternate pulses should have the form of the weld-post-heat pulse shown in Fig. 3B last graph, the apparatus may also operate with the switch in the Post Heat position, however, ordinarily in the situation under consideration the switch SWP is in the Weld position.

With the various thyratrons and ignitrons in the condition described for stand-by operation, the material M is now interposed between the electrodes E1 and E2 and the start switch SW is closed. The squeeze thyratron ST and the auxiliary thyratron AT2 are rendered conductive. The current flow through the squeeze thyratron ST causes relay SR to be energized and it is locked in through contact 21. Through contact 19 the valve solenoid SV is energized and pressure is applied to cause electrode E1 to engage the work M.

Auxiliary thyratron AT2 becomes conductive, network AN2 is charged and auxiliary thyratron AT3 is rendered non-conductive. The squeeze network SN then discharges and after a predetermined time interval permits auxiliary thyratron AT4 to become conductive. Network AN3 is then charged causing auxiliary thyratron AT5 to become non-conductive. This is followed by the conduction of the weld thyratron WT and the transmission of pulses through the secondary S7 of transformer P7. At the same time the charging of the weld network WN is interrupted but the latter is prevented from discharging because the thyratron 4LT2 is conductive.

By the pulses transmitted through secondary S7, thyratron 2LT1 is now rendered conductive rendering thyratron 2LT2 non-conductive. Bus DL1 now becomes less negative permitting thyratrons CT1 to CT6 to conduct.

Figure 4B:
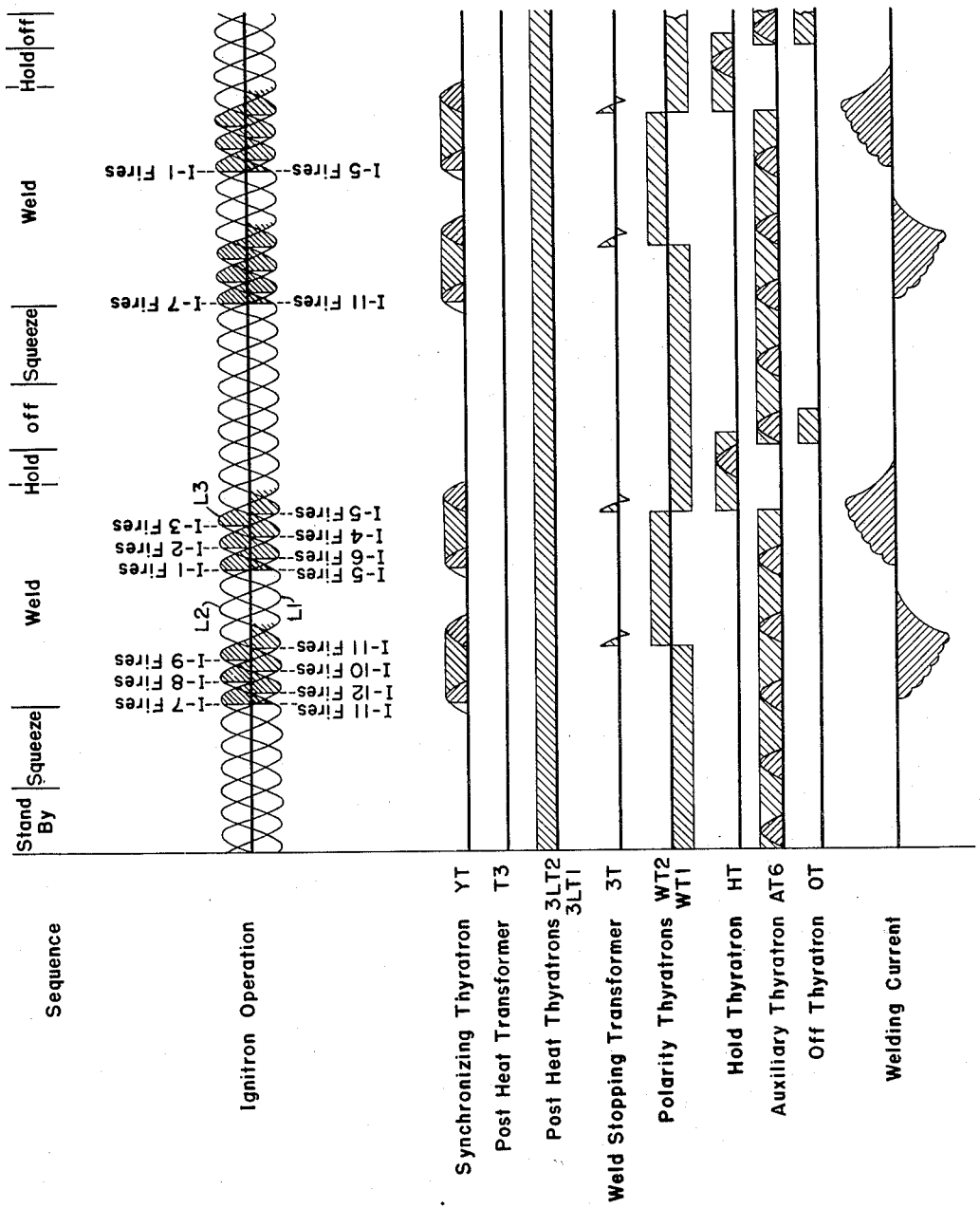

The graphs presented in Figs. 4A and 4B correspond to a situation in which thyratron WT1 is first conductive and thyratron WT2 non-conductive. Under the circumstances the conduction of thyratrons CT1 to CT6 causes current to flow through the transformers 1TO1 to 1TO6. The corresponding ignitrons I–7 to I–12 are then rendered conductive in the sequence I–7 and I–11 initially then I–12, I–8, I–10, I–9 and I–11. The last thyratron to conduct during this cycle is CT6 and it causes a pulse to be transmitted through the primary PO7 of the transformer TO7. A pulse is now impressed through a secondary 2SO7 in the anode circuit of thyratron PT. The network DN connected in the grid circuit of this thyratron is set so that after this first cycle of operation the thyratron PT can fire. The thyratron then fires causing a pulse to flow through the primary P3. A pulse is then impressed through the secondary 2SO3 in the grid circuit of thyratron 2LT2 rendering the latter conductive and thyratron 2LT1 non-conductive. Since the switch SWP is in the weld-only position, the flip-flop circuit 3FF is uneffected and does not affect the potential impressed on the bus DL1. Since the thyratron 2LT2 is conductive, the bus DL1 is reduced to its original negative potential and the thyratrons CT1 to CT6 are prevented from again conducting. The current flow through ignitrons I–7 to I–12 then decays to zero.

A pulse through the secondary 1S3 also changes the operation of the flip-flop circuit 1FF from the condition in which thyratron 1LT2 is conductive to a condition in which thyratron 1LT1 conducts. Thyratron WT2 then becomes conductive and thyratron WT1 becomes non-conductive setting the circuit units including the thyratron CT1 to CT6 for operation so that during the phase of operation now to follow the pulses will be transmitted through the transformers 2PO1 to 2PO6.

We may now digress and observe what change occurred in the weld-time capacitor 265 while the welding current was flowing. When thyratron 2LT2 originally become non-conductive, a pulse was transmitted through the differentiating circuit to render thyratron 4LT1 conductive and thyratron 4LT2 non-conductive. Diode D10 conducted permitting the capacitor 265 of the weld network WN in the Sequence Timer to discharge.

The charge leaked off through the resistor 639 and the diode D10 only so long as thyratron 4LT2 was non-conductive. This persisted only until the timing capacitor TC4 discharged through the resistor TR4 sufficiently to permit the thyratron 4LT2 to again conduct. Thyratron 4LT2 then conducted at an instant predetermined by the phase shift network 637 in the primary P10 of the peaking transformer T10. This transformer is preferably set to fire thyratron 4LT2 at an instant one-sixth of a period after the zero instant of the positive half period of the potential supplied by the buses L1, L2. The discharge time may be set later in this period or earlier in the period depending on the desired duration of the discharge of the capacitor 265.

Now the resistor 239 in the discharge circuit is set to permit only a small portion of the charge on the capacitor 265 to leak off, while thyratron 4LT2 is non-conductive, and the capacitor 265 remains in a condition such as to prevent the hold thyratron HT from conducting.

Returning now to the operation of the flip-flop circuit 2FF it is noted that thyratron 2LT2 is conductive. Network DN is then again reset for a second operation and thyratron PT is held non-conductive. Since the hold thyratron HT is held non-conductive by the weld network WN, the Sequence Timer remains unchanged and the weld thyratron WT continues to conduct during each positive half-periods of the buses L1 and L2. Potential is then supplied across the section 601—175 of the diode D5; however, thyratron 2LT1 is prevented from becoming conductive by the bias impressed by the capacitor TC2. This bias remains of sufficient magnitude to hold thyratron 2LT1 non-conductive for a desired pause interval.

Eventually the bias in capacitor TC2 decreases sufficiently to permit thyratron 2LT1 to conduct again. Thyratron 2LT2 now becomes non-conductive so that the bias on bus DL1 becomes less negative and thyratrons CT1 to CT6 again conduct. This time the thyratrons conduct through the transformers 2TO1 to 2TO6 since thyratron WT2 is conductive. Ignitrons I–1 to I–6 are then rendered conductive in the succession I–1 and I–5 then I–6, I–2, I–4, I–3 and I–5 and current is transmitted upward through the primary P.

In addition, thyratron 4LT1 is rendered conductive and 4LT2 non-conductive so that there is another incremental discharge of the capacitor 265.

At the end of this cycle of operation when thyratron CT6 is rendered conductive, thyratron 2LT2 is again rendered conductive and another pause interval is initiated. The above-described pause and weld process may then be again repeated.

The number of incremental discharges of capacitor 265 while thyratron 4LT2 is non-conductive may be set at any desired value by setting the resistor 639 in the discharge circuit and the phase shift network 637 which supplies the firing potential for the thyratron 4LT2. In the situation represented by Figs. 4A and 4B, only two such discharges permit the capacitor 265 to discharge sufficiently to terminate the welding operation. Under the circumstances the hold thyratron HT is rendered conductive and charges the auxiliary network AN5 in turn rendering the auxiliary thyratron AT6 non-conductive. If the synchronizing thyratron YT is now non-conductive, the hold network HN may discharge at the end of the hold time firing the off thyratron OT and permitting the off network ON to charge. The squeeze thyratron ST and the auxiliary thyratron AT2 are then rendered non-conductive and as has been described, the apparatus is reset for a second operation.

The secondary current which flows during the welding operation described above is represented by the negative and positive waves in the left in the lowest graph of Fig. 4B. If the switch SW remains closed another operation takes place and additional negative and positive welding pulses are transmitted as shown in Figs. 4A and 4B.

CONCLUSION

It is seen that the apparatus disclosed herein is highly flexible and is capable of operating at a high speed. It provides facilities for producing welding pulses of any reasonable desired number and any reasonable desired wave form.

While I have described specific embodiments of my invention, many modifications thereof are possible. It is to be noted, particularly, that the transformers 1TO1 to 1TO6 and 2TO1 to 2TO6 need not all have two secondaries. Since thyratron CT1 fires and it must fire two series connected ignitrons it is necessary only that the transformers 1TO1 and 2TO2 in its anode circuit need have two secondaries each.

In certain situations, particularly where a separate weld is produced by each low frequency pulse (Figs. 3A—3B), it is desirable that the hold time be positively prevented from starting until after the welding current has stopped flowing. This object is accomplished by a system such as is shown in Fig. 5 in which the synchronizing thyratron YT instead of being controlled from the flip-flop circuit 2FF is controlled from the primary P of the welding transformer W. A signal is derived from a voltage divider 801 across the primary. This signal is impressed through the rectifier 803 in the control circuit of the synchronizing thyratron YT in such a sense that the thyratron is conductive so long as the primary P carries current. So long as the thyratron is conductive the timing out of the hold network is prevented. Thus a new low-frequency half period is prevented from starting until the previous half period has stopped.

The signal may also be derived from a current transformer coupled to the primary P. In either the arrangement shown or the current transformer arrangement a step up transformer may be interposed between the signal takeoff and the rectifier 803 to step up the sensitivity.

The above described arrangement applies to situations in which only one low frequency pulse is produced per weld. In situations where several pulses are produced per weld as illustrated by Figs. 4A and 4B, the synchronizing thyratron YT should be left connected as in Figs. 1A to 1K and the signal from rectifier 803 should be supplied to maintain thyratron 2LT2 non-conductive (for example, by maintaining capacitor TC2 charged) until after the flow of welding current has stopped during each pulse. In this latter modification of my invention the direct-current terminals of the rectifier 803 are connected to charge capacitor TC2 so that its plate connected to the grid of 2LT1 remains negative. Such a modification is shown in Fig. 6.

My invention is not to be restricted except insofar as is necessitated by the prior art and the spirit of the invention.

I claim as my invention:

1. In combination, a plurality of supply conductors adapted to be connected to a polyphase supply, a first load conductor, a second load conductor, a first plurality of ignitrons corresponding in number to said plurality of supply conductors and each having an anode, a cathode and an igniter, a connection between the anode of each of said ignitrons and a corresponding supply conductor, a connection between the cathode of each of said ignitrons and said first load conductor, a second plurality of ignitrons each having an anode, a cathode and an igniter corresponding in number to said plurality of supply conductors, a connection between the cathode of each of said second plurality of ignitrons and a corresponding supply conductor, a connection between the anodes of said second plurality of ignitrons and said first load conductor, a third plurality of ignitrons corresponding in number to said plurality of supply conductors and each having an anode, a cathode and an igniter, a connection between the anode of each of said third plurality of ignitrons and a corresponding supply conductor, a connection between the cathodes of said third plurality of ignitrons and said second load conductor, a fourth plurality of ignitrons corresponding in number to said plurality of buses and each having an anode, a cathode and an igniter, a connection between the cathode of each ignitron of said fourth plurality and a corresponding supply conductor, a connection between the anodes of said fourth plurality of ignitrons and said second load conductor, a firing thyratron having an anode, a cathode and a control electrode corresponding to each ignitron, a connection between the anode of each said thyratron and the anode of its corresponding ignitron, a connection between the cathode of each said thyratron and the igniter of the corresponding ignitron, means connected to the control electrodes of the thyratrons associated with the first and fourth pluralities of ignitrons for rendering said thyratrons and their associated ignitrons conductive in a predetermined succession for a first time interval, and means connected to the control electrodes of the thyratrons associated with said second and third pluralities of ignitrons for rendering the last said thyratrons and their associated ignitrons conductive in a predetermined succession during a second time interval.

2. Apparatus for deriving power from the buses of a polyphase source and supplying power to a single phase load at a lower frequency than that of said source comprising in combination a first pair of electric discharge devices each having an anode, a cathode and a control electrode associated with each pair of said buses; means connecting the anode and cathode of each device between said associated buses and said load to conduct current of one polarity from one of said associated pair of buses to the other of said pair of buses through said load; a second pair of electric discharge devices each having an anode, a cathode and a control electrode associated with each of said pairs of buses; means connecting said anodes and cathodes of each said last-named devices between said associated buses and said load to conduct current of said one polarity from said other bus to said one bus through said load; a third pair of electric discharge devices, each having an anode, a cathode and a control electrode associated with each pair of buses; means connecting said anode and cathode of each said last-named device between said last-named associated buses and said load to conduct current of the opposite polarity from one bus of each said last-named associated pair to the other bus of each said last-named associated pair through said load; a fourth pair of electric discharge devices each having an anode, a cathode and a control electrode associated with each of said pairs of buses; means connecting said anode and cathode of each said last-named device between said last-named associated buses and said load to conduct current of said opposite polarity from said last-named other bus to said last-named one bus through said load; a first input impedance connected in circuit with the control electrodes of the discharge devices of each of said first pair; a second input impedance connected in circuit with the control electrodes of the discharge devices of each of said second pair; a third input impedance connected in circuit with the control electrodes of the discharge devices of each of said third pair; a fourth input impedance connected in circuit with the control electrodes of the discharge devices of each of said fourth pair; the conduction of current through each of said input impedances causing the corresponding discharge devices to become conductive; an auxiliary electric discharge device having an anode, a cathode and a control electrode associated with each first and third impedance; an auxiliary electric discharge device having an anode, a cathode and a control electrode associated with each second and fourth impedance; a first plurality of circuit units each including in series the following components: a corresponding one of said first impedance, means for impressing a potential in phase with that supplied by the pair of buses to which the main discharge device associated with said first impedance is connected and the anode and cathode of the associated auxiliary discharge device; a second plurality of circuit units each including in series the following components: a corresponding one of said second impedance, means for supplying a potential in phase with that of the buses connected to the main discharge device associated with said second impedance and the anode and cathode of the associated auxiliary discharge device; a third plurality of circuit units each including in series the following components: a corresponding one of said third impedance, means for supplying a potential in phase with the potential of the buses connected to the main discharge device with which said third impedance is associated and the anode and cathode of the associated auxiliary device; a fourth plurality of circuit units each including in series with the following components: a corresponding one of said fourth impedance, means for impressing a potential in phase with the potential connected to the discharge device associated with said fourth impedance and the anode and cathode of the associated auxiliary discharge device; and means connected to the control electrodes of said auxiliary discharge devices for rendering said discharge devices conductive in a predetermined succession.

3. Apparatus according to claim 2 characterized by the fact that said first and third circuit units are associated with a single auxiliary device and said second and fourth circuit units are similarly associated with a single device, said first and third and second and fourth impedances being each connected as separate branches of the anode-cathode circuit of said auxiliary device and by switch means for selectively connecting the branches including said first and second or said third and fourth impedances in the associated anode-cathode circuits.

4. In combination, a plurality of supply conductors adapted to be connected to a polyphase supply; a first load conductor; a second load conductor; a first plurality of ignitrons each having an anode, a cathode and an igniter and each corresponding to one of said plurality of the supply conductors; a connection between the anode of each ignitron of said first plurality of ignitrons and a corresponding supply conductor; a connection between the cathodes of said ignitrons and said first load conductor; a second plurality of ignitrons each having an anode, a cathode and an igniter, and each corresponding to a supply conductor; a connection between the cathode of each of said second plurality of ignitrons and a corresponding supply conductor; a connection between the anodes of said second plurality of ignitrons and said first load conductor; a third plurality of ignitrons each having an anode, a cathode and an igniter, and each corresponding to a supply conductor; a connection between the anode of each ignitron of said third plurality and its corresponding supply conductor; a connection between the cathodes of said ignitrons of said third plurality and said second load conductor; a fourth plurality of ignitrons each having an anode, a cathode and an igniter, and each corresponding to a supply conductor; a connection between the anode of each ignitron of said fourth plurality and its corresponding supply conductor; a connection between the cathodes of the ignitrons of said fourth plurality and said second load conductor; a firing thyratron, having an anode, a cathode and a control electrode associated with each ignitron; a connection between the anode of each thyratron and the anode of its associated ignitron; a connection between the cathode of each thyratron and the igniter of the corresponding ignitrons; means connected to the control electrodes of the thyratrons associated with said first and fourth pluralities and operative during a predetermined time interval for impressing simultaneously a potential on the control electrode of a thyratron associated with the first plurality of ignitrons and the control electrode of a thyratron associated with said fourth plurality of ignitrons and thereafter during said interval impressing potentials in a predetermined succession on the control electrodes of the others of the thyratrons of said first and fourth pluralities to render said thyratrons and their corresponding ignitrons conducting in a predetermined succession during said first interval; and means connected to the control electrodes of the thyratrons associated with the ignitrons of said second and third pluralities and operative during a second time interval for impressing simultaneously potentials on the control electrode of a thyratron associated with an ignitron of said second plurality and on the control electrode of a thyratron associated with an ignitron of said third plurality and thereafter during said second interval impressing potentials in a predetermined succession, on the control electrodes of the others of the thyratrons associated with the ignitrons of said second and third pluralities in succession to render said thyratrons and their associated ignitrons conducting during said second time interval in a predetermined succession.

5. Apparatus for deriving power from a polyphase source and supplying said power to a single phase load at a lower frequency than that of the source, including a plurality of groups of main electric discharge devices, each group being associated with a phase of said source, and including at least one device and each device having a plurality of principal electrodes and a control electrode; means connecting the principal electrodes of the devices of each group between the associated phase of said source and said load; an auxiliary electric discharge device associated with each group of main discharge devices, said auxiliary device having a pair of principal electrodes and a control electrode; an output impedance connected in a circuit with the principal electrodes of each auxiliary device; means connected to each output impedance and the principal electrodes in circuit therewith for supplying said output impedance and said last-named principal electrodes with a first potential in phase with the potential of the associated phase of said source; means connecting each output impedance between the control electrodes and principal electrodes of the main devices of the associated group; and means connected to the control electrode and the cathode of each auxiliary device for impressing between said control electrode and said cathode of each said auxiliary device a second potential in phase with another phase of said source than the associated phase, said other phase being so selected that said second potential lags said first potential in phase, said last-named impressing means including means connected in common to said control electrodes of all said auxiliary devices for superimposing on said second potential a direct current potential; and means for varying at the will of an operator the magnitude of said direct current potential.

6. A heat control circuit for control apparatus for a polyphase-to-single-phase low-frequency welder which control apparatus includes a first plurality of main valves adapted to be so connected between the individual phases of a polyphase source and said welder that when they are conducting they build up the current of one polarity in said welder by transmitting a series of successive pulses of said one polarity from the said individual phases through the welder, and a second plurality of main valves adapted to be so connected between the individual phases of said source and said welder that when they are conducting they build up the current of the opposite polarity by transmitting a series of successive pulses of said opposite polarity from said individual phases through said welder; the said heat control circuit comprising in combination a plurality of circuit units corresponding in number of said pulses in a single cycle of operation of said first and second plurality of main valves, each circuit unit including an auxiliary electric discharge device having a plurality of principal electrodes and a control electrode; said principal electrode being connected in series with a pair of branch control networks, one of said control networks being connected to the associated discharge devices of the first plurality to render said devices conducting when current is transmitted through said branch control network and the other of said networks being connected to the associated discharge devices of the second plurality to render said last-named discharge devices conducting when current is transmitted through said other branch network, each circuit unit also including connected thereto means for supplying a potential in phase with the the potential of the phase of said source to which the associated main valves of the first and second plurality are connected, and said branch networks being connected in the circuit of the principal electrodes of the associated auxiliary device through selective switch means so that one or the other of said branch networks may at any time be connected in said circuit units; each circuit unit further including means for impressing a potential between the control electrode and the principal electrode of the associated auxiliary device in phase with a phase of said source other than the phase associated with the corresponding branch networks, such phase being so selected that the corresponding potential lags the potential impressed between the principal electrodes of the associated auxiliary device in phase; and means connected in common to the control electrodes of the auxiliary devices of all said circuit units for superimposing pulses of direct current of magnitude which may be set at the will of an operator on said control potential in all of said circuit units.

7. A heat control circuit according to claim 6 characterized by the fact that the means for impressing the direct current pulses includes a flip-flop circuit for permitting the pulses to be impressed during a first predetermined time interval and restraining the pulses from being impressed during a second predetermined time interval.

8. A heat control circuit according to claim 6 characterized by the fact that the switch means comprises a pair of thyratrons each having a control electrode and a pair of principal electrodes common to all the circuit units, the principal electrodes of one of said thyratrons being connected in circuit with one branch network and the principal electrodes of the other of said thyratrons being connected in circuit with the other branch network.

9. A heat control circuit according to claim 8 characterized by a flip-flop circuit connected to the control electrodes of the thyratrons and having two conditions in one of which one of said thyratrons is rendered conductive and in the other of which the other of said thyratrons is rendered conductive.

10. A heat control circuit according to claim 6 characterized by means for impressing direct current potential pulses which includes means responsive to the conduction of current through the last of the circuit units to conduct during any cycle of operation for suppressing each direct current pulses.

11. A heat control circuit according to claim 9 characterized by control means for the flip-flop circuit including means interconnecting the flip-flop circuit and the circuit unit which operates at the end of each cycle of operation and responsive to the conduction of said last-named circuit unit to cause the flip-flop circuit to pass from one of its conditions to the other.

12. In combination, a plurality of supply conductors adapted to be connected to a polyphase supply; a first load conductor; a second load conductor; a first plurality of ignitrons each having an anode, a cathode and an igniter and each corresponding to one of said plurality of the supply conductors; a connection between the anode of each ignitron of said first plurality of ignitrons and a corresponding supply conductor; a connection between the cathodes of said ignitrons and said first load conductors; a second plurality of ignitrons each having an anode, a cathode and an igniter, and each corresponding to a supply conductor; a connection between the cathode of each of said second plurality of ignitrons and a corresponding supply conductor; a connection between the anodes of said second plurality of ignitrons and said first load conductor; a third plurality of ignitrons each having an anode, a cathode and an igniter, and each corresponding to a supply conductor; a connection between the anode of each ignitron of said third plurality and its corresponding supply conductor; a connection between the cathodes of said ignitrons of said third plurality and said second load conductor; a fourth plurality of ignitrons each having an anode, a cathode and an igniter, and each corresponding to a supply conductor; a connection between the anode of each ignitron of said fourth plurality and its corresponding supply conductor; a connection between the cathodes of the ignitrons of said fourth plurality and said second load conductor; a firing thyratron, having an anode, a cathode and a control electrode associated with each ignitron; a connection between the anode of each thyratron and the anode of its associated ignitron; a connection between the cathode of each thyratron and the igniter of the corresponding ignitron; means connected to the firing thyratrons connected to the ignitrons of the first and fourth pluralities and operative during a predetermined time interval for initially impressing simultaneously a potential on the control electrode of a thyratron associated with the first plurality of ignitrons and the control electrode of a thyratron associated with said fourth plurality of ignitrons and thereafter in succession impressing potentials on the control electrodes of the other of said thyratrons of said first and fourth plurality each in its turn to render said thyratrons and their corresponding ignitrons conducting in a predetermined succession during said first interval; and means connected to the firing thyratron connected to the ignitrons of the second and third pluralities and operative during a second time interval for impressing initially simultaneous potentials on the control electrode of a thyratron associated with an ignitron of said second plurality and on the control electrode a thyratron associated with an ignitron of said third plurality and thereafter in succession impressing potentials on the control electrodes of the other of said thyratrons of said second and third plurality each in its turn to render said thyratrons and their associated ignitrons conducting in a predetermined succession during said second time interval in said succession.

References Cited in the file of this patent
UNITED STATES PATENTS

| | | |
|---|---|---|
| 1,992,277 | Allen | Feb. 26, 1935 |
| 2,059,562 | Curtis | Nov. 3, 1936 |
| 2,234,690 | Depp | Mar. 11, 1941 |
| 2,235,385 | Rava | Mar. 18, 1941 |
| 2,289,321 | Collom | July 7, 1942 |
| 2,310,105 | Michel | Feb. 2, 1943 |
| 2,366,038 | Livingston | Dec. 26, 1944 |
| 2,370,071 | Poole | Feb. 20, 1945 |
| 2,374,044 | Smith | Apr. 17, 1945 |
| 2,489,892 | Barwick | Sept. 27, 1949 |
| 2,549,667 | Cosby | Apr. 17, 1951 |
| 2,587,151 | Hansen | Feb. 26, 1952 |
| 2,600,519 | Solomon | June 17, 1952 |
| 2,611,796 | Conangla | Sept. 23, 1952 |
| 2,619,591 | Parsons | Nov. 25, 1952 |
| 2,623,204 | Solomon | Dec. 23, 1952 |
| 2,637,010 | Charske | Apr. 28, 1953 |
| 2,656,461 | Elliott | Oct. 20, 1953 |
| 2,659,854 | Wengel | Nov. 17, 1953 |